(12) United States Patent
Rastegar et al.

(10) Patent No.: US 9,160,009 B2
(45) Date of Patent: Oct. 13, 2015

(54) COMPACT AND LOW-VOLUME MECHANICAL IGNITER AND IGNITION SYSTEMS FOR THERMAL BATTERIES AND THE LIKE

(71) Applicants: Jahangir S Rastegar, Stony Brook, NY (US); Richard T Murray, Patchogue, NY (US)

(72) Inventors: Jahangir S Rastegar, Stony Brook, NY (US); Richard T Murray, Patchogue, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 14/029,711

(22) Filed: Sep. 17, 2013

(65) Prior Publication Data
US 2014/0013983 A1 Jan. 16, 2014

Related U.S. Application Data

(62) Division of application No. 12/835,709, filed on Jul. 13, 2010, now Pat. No. 8,550,001.

(60) Provisional application No. 61/239,048, filed on Sep. 1, 2009.

(51) Int. Cl.
F42C 19/06 (2006.01)
H01M 6/38 (2006.01)
F42C 11/00 (2006.01)
F42C 15/24 (2006.01)
H01M 6/36 (2006.01)
F42C 1/04 (2006.01)

(52) U.S. Cl.
CPC . H01M 6/38 (2013.01); F42C 1/04 (2013.01); F42C 11/008 (2013.01); F42C 15/24 (2013.01); H01M 6/36 (2013.01)

(58) Field of Classification Search
CPC .......... F42C 7/00; F42C 11/008; H01M 6/36; H01M 6/5088
USPC .................. 102/216, 322, 204, 247, 248, 253
See application file for complete search history.

(56) References Cited

U.S. PATENT DOCUMENTS 5,591,935 A * 1/1997 Shamblen et al. ............ 102/500
2001/0013766 A1* 8/2001 Kroll et al. ................... 320/104

* cited by examiner

*Primary Examiner* — J. Woodrow Eldred

(57) ABSTRACT

An ignition system for a thermal battery where the ignition system includes: a base plate for connection to the thermal battery; and two or more inertial igniters formed on the base plate, each of the two or more inertial igniters having a striker mass which ignites one or more pyrotechnic materials upon a predetermined acceleration profile, the base plate having an opening corresponding to each of the two or more inertial igniters for allowing a generated spark to pass into the thermal battery.

2 Claims, 21 Drawing Sheets

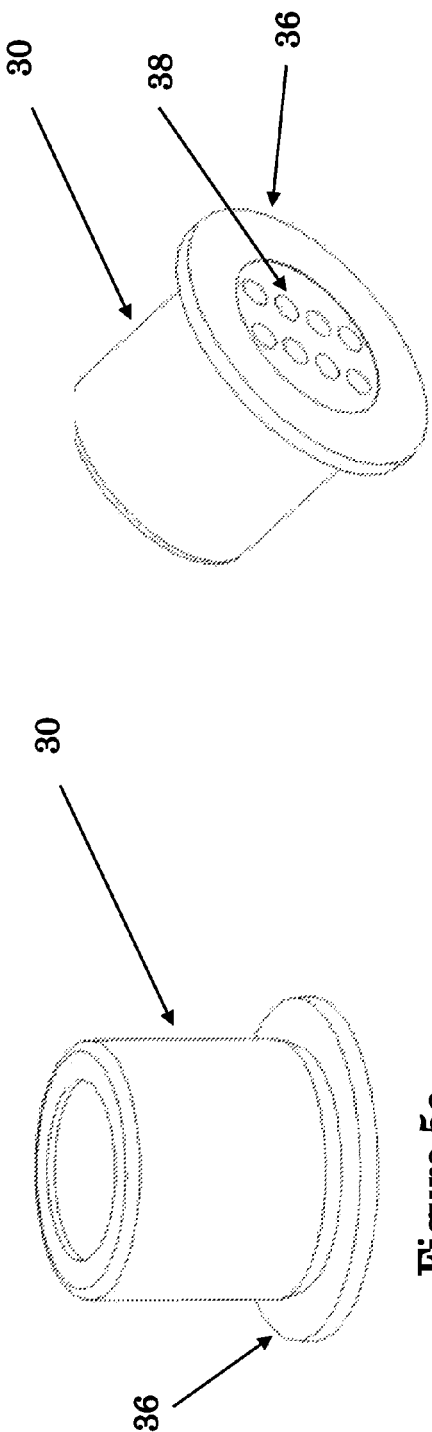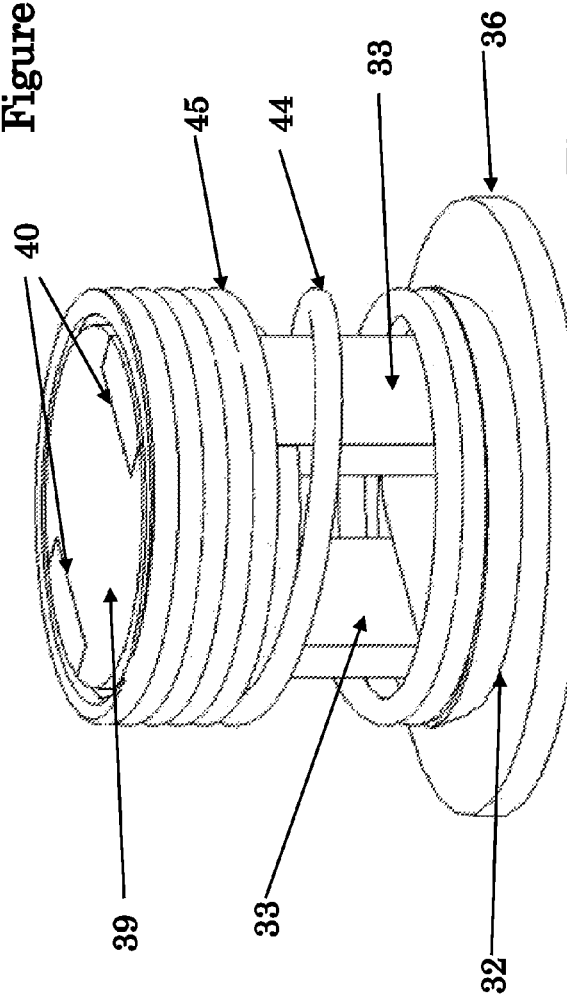
Figure 5a
Figure 5b
Figure 5c

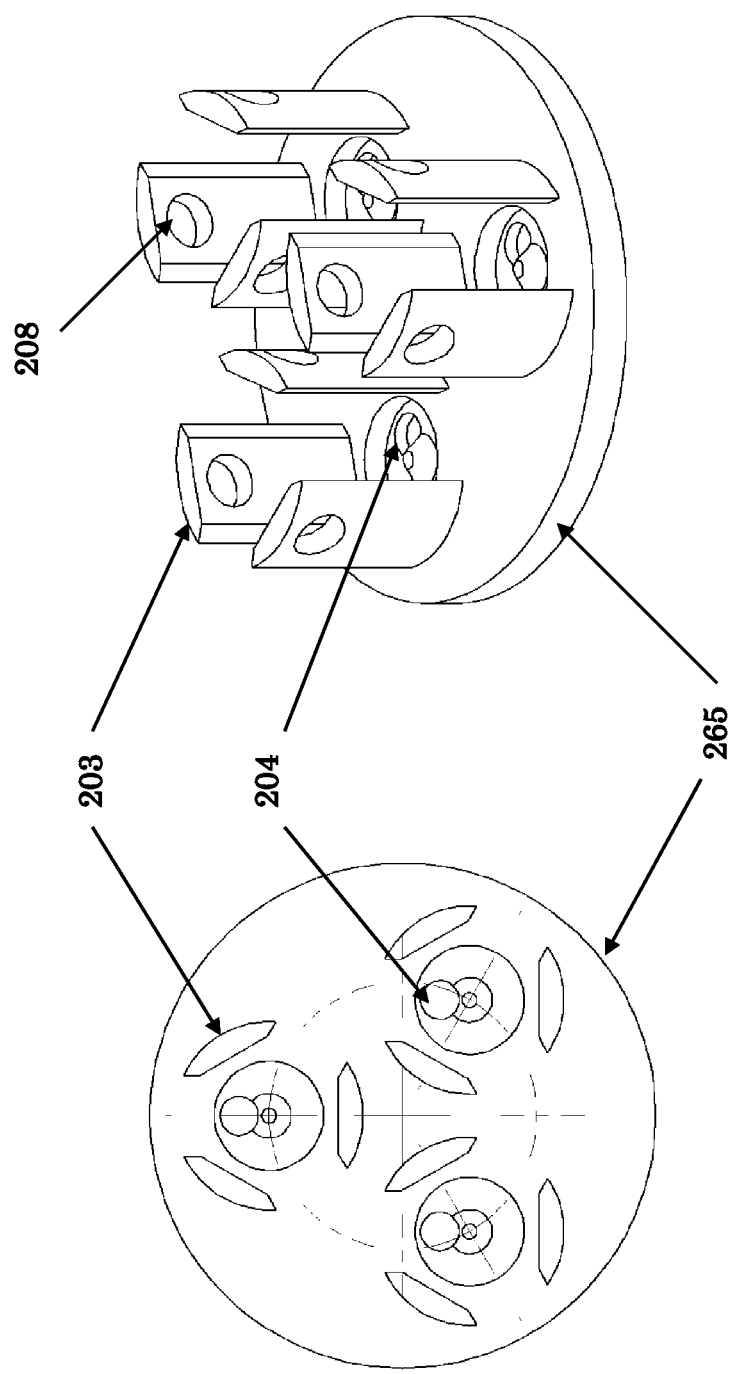

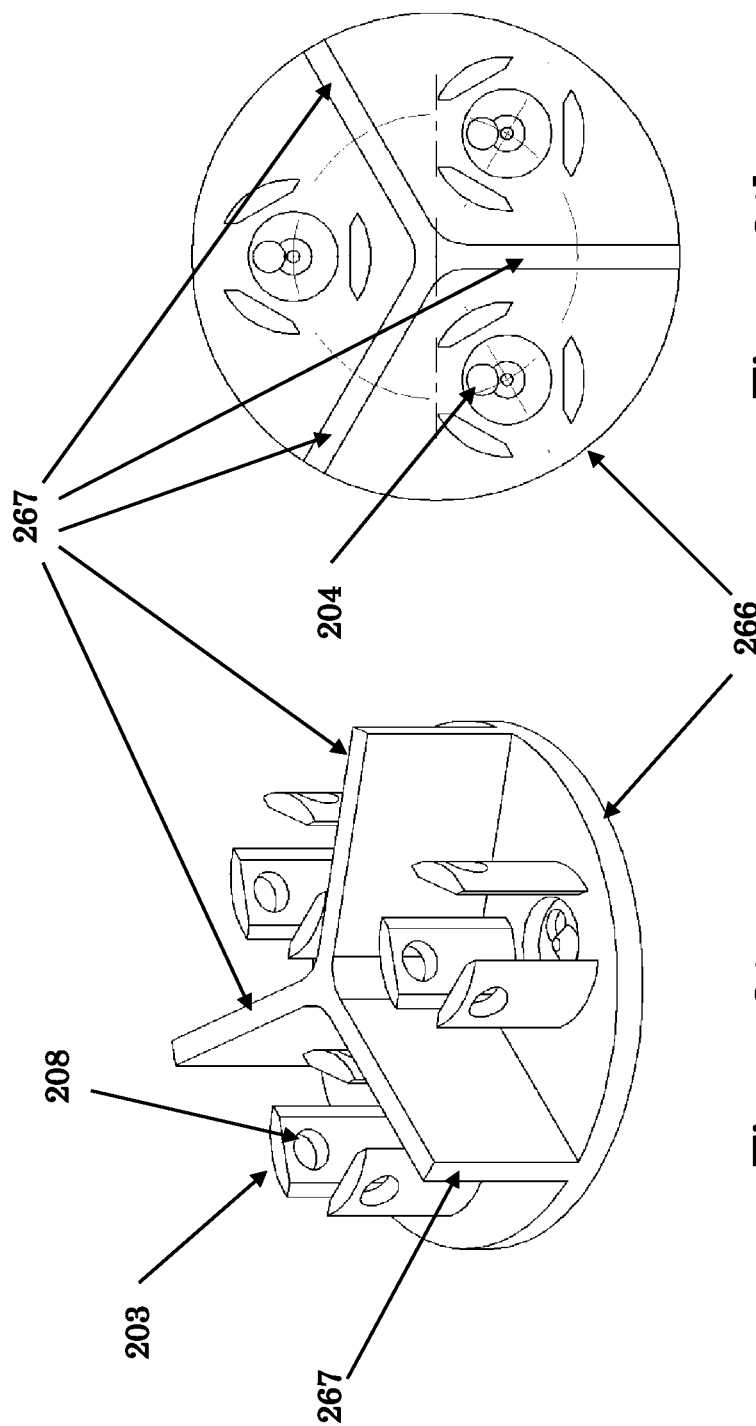

(12)  US 9,160,009 B2

COMPACT AND LOW-VOLUME MECHANICAL IGNITER AND IGNITION SYSTEMS FOR THERMAL BATTERIES AND THE LIKE

CROSS-REFERENCE TO RELATED APPLICATION

This application is a Divisional application of U.S. application Ser. No. 12/835,709 filed on Jul. 13, 2010, which claims the benefit of U.S. Provisional Application No. 61/239,048 filed on Sep. 1, 2009, the entire contents of each of which is incorporated herein by reference.

BACKGROUND OF THE INVENTION

1. Field of the Invention

The present invention relates generally to mechanical igniters, and more particularly to compact, low-volume, reliable and easy to manufacture mechanical igniters and ignition systems for thermal batteries and the like.

2. Prior Art

Thermal batteries represent a class of reserve batteries that operate at high temperature. Unlike liquid reserve batteries, in thermal batteries the electrolyte is already in the cells and therefore does not require a distribution mechanism such as spinning. The electrolyte is dry, solid and non-conductive, thereby leaving the battery in a non-operational and inert condition. These batteries incorporate pyrotechnic heat sources to melt the electrolyte just prior to use in order to make them electrically conductive and thereby making the battery active. The most common internal pyrotechnic is a blend of Fe and $KClO_4$. Thermal batteries utilize a molten salt to serve as the electrolyte upon activation. The electrolytes are usually mixtures of alkali-halide salts and are used with the $Li(Si)/FeS_2$ or $Li(Si)/CoS_2$ couples. Some batteries also employ anodes of Li(Al) in place of the Li(Si) anodes. Insulation and internal heat sinks are used to maintain the electrolyte in its molten and conductive condition during the time of use. Reserve batteries are inactive and inert when manufactured and become active and begin to produce power only when they are activated.

Thermal batteries have long been used in munitions and other similar applications to provide a relatively large amount of power during a relatively short period of time, mainly during the munitions flight. Thermal batteries have high power density and can provide a large amount of power as long as the electrolyte of the thermal battery stays liquid, thereby conductive. The process of manufacturing thermal batteries is highly labor intensive and requires relatively expensive facilities. Fabrication usually involves costly batch processes, including pressing electrodes and electrolytes into rigid wafers, and assembling batteries by hand. The batteries are encased in a hermetically-sealed metal container that is usually cylindrical in shape. Thermal batteries, however, have the advantage of very long shelf life of up to 20 years that is required for munitions applications.

Thermal batteries generally use some type of igniter to provide a controlled pyrotechnic reaction to produce output gas, flame or hot particles to ignite the heating elements of the thermal battery. There are currently two distinct classes of igniters that are available for use in thermal batteries. The first class of igniter operates based on electrical energy. Such electrical igniters, however, require electrical energy, thereby requiring an onboard battery or other power sources with related shelf life and/or complexity and volume requirements to operate and initiate the thermal battery. The second class of igniters, commonly called "inertial igniters", operates based on the firing acceleration. The inertial igniters do not require onboard batteries for their operation and are thereby often used in high-G munitions applications such as in gun-fired munitions and mortars.

In general, the inertial igniters, particularly those that are designed to operate at relatively low impact levels, have to be provided with the means for distinguishing events such as accidental drops or explosions in their vicinity from the firing acceleration levels above which they are designed to be activated. This means that safety in terms of prevention of accidental ignition is one of the main concerns in inertial igniters.

In recent years, new improved chemistries and manufacturing processes have been developed that promise the development of lower cost and higher performance thermal batteries that could be produced in various shapes and sizes, including their small and miniaturized versions. However, the existing inertial igniters are relatively large and not suitable for small and low power thermal batteries, particularly those that are being developed for use in miniaturized fuzing, future smart munitions, and other similar applications.

The need to differentiate accidental and initiation accelerations by the resulting impulse level of the event necessitates the employment of a safety system which is capable of allowing initiation of the igniter only during high total impulse levels. The safety mechanism can be thought of as a mechanical delay mechanism, after which a separate initiation system is actuated or released to provide ignition of the pyrotechnics. An inertial igniter that combines such a safety system with an impact based initiation system and its alternative embodiments are described herein together with alternative methods of initiation pyrotechnics.

Inertia-based igniters must therefore comprise two components so that together they provide the aforementioned mechanical safety (delay mechanism) and to provide the required striking action to achieve ignition of the pyrotechnic elements. The function of the safety system is to fix the striker in position until a specified acceleration time profile actuates the safety system and releases the striker, allowing it to accelerate toward its target under the influence of the remaining portion of the specified acceleration time profile. The ignition itself may take place as a result of striker impact, or simply contact or proximity. For example, the striker may be akin to a firing pin and the target akin to a standard percussion cap primer. Alternately, the striker-target pair may bring together one or more chemical compounds whose combination with or without impact will set off a reaction resulting in the desired ignition.

In addition to having a required acceleration time profile which will actuate the device, requirements also commonly exist for non-actuation and survivability. For example, the design requirements for actuation for one application are summarized as:

1. The device must fire when given a [square] pulse acceleration of 900 G±150 G for 15 ms in the setback direction.

2. The device must not fire when given a [square] pulse acceleration of 2000 G for 0.5 ms in any direction.

3. The device must not actuate when given a ½-sine pulse acceleration of 490 G (peak) with a maximum duration of 4 ms.

4. The device must be able to survive an acceleration of 16,000 G, and preferably be able to survive an acceleration of 50,000 G.

A schematic of a cross-section of a conventional thermal battery and inertial igniter assembly is shown in FIG. 1. In thermal battery applications, the inertial igniter 10 (as assembled in a housing) is generally positioned above the thermal battery housing 11 as shown in FIG. 1. Upon ignition, the igniter initiates the thermal battery pyrotechnics positioned inside the thermal battery through a provided access 12. The total volume that the thermal battery assembly 16 occupies within munitions is determined by the diameter 17 of the thermal battery housing 11 (assuming it is cylindrical) and the total height 15 of the thermal battery assembly 16. The height 14 of the thermal battery for a given battery diameter 17 is generally determined by the amount of energy that it has to produce over the required period of time. For a given thermal battery height 14, the height 13 of the inertial igniter 10 would therefore determine the total height 15 of the thermal battery assembly 16. To reduce the total volume that the thermal battery assembly 16 occupies within a munitions housing, it is therefore important to reduce the height of the inertial igniter 10. This is particularly important for small thermal batteries since in such cases the inertial igniter height with currently available inertial igniters can be almost the same order of magnitude as the thermal battery height.

With currently available inertial igniters, a schematic of which is shown in FIG. 2, the inertial igniter 20 may have to be positioned within a housing 21 as shown in FIG. 3, particularly for relatively small igniters. The housing 21 and the thermal battery housing 11 may share a common cap 22, with the opening 25 to allow the ignition fire to reach the pyrotechnic material 24 within the thermal battery housing. As the inertial igniter is initiated, the sparks can ignite intermediate materials 23, which can be in the form of thin sheets to allow for easy ignition, which would in turn ignite the pyrotechnic materials 24 within the thermal battery through the access hole 25.

A schematic of a cross-section of a currently available inertial igniter 20 is shown in FIG. 2 in which the acceleration is in the upward direction (i.e., towards the top of the paper). The igniter has side holes 26 to allow the ignition fire to reach the intermediate materials 23 as shown in FIG. 3, which necessitate the need for its packaging in a separate housing, such as in the housing 21. The currently available inertial igniter 20 is constructed with an igniter body 60. Attached to the base 61 of the housing 60 is a cup 62, which contains one part of a two-part pyrotechnic compound 63 (e.g., potassium chlorate). The housing 60 is provided with the side holes 26 to allow the ignition fire to reach the intermediate materials 23 as shown in FIG. 3. A cylindrical shaped part 64, which is free to translate along the length of the housing 60, is positioned inside the housing 60 and is biased to stay in the top portion of the housing as shown in FIG. 2 by the compressively preloaded helical spring 65 (shown schematically as a heavy line). A turned part 71 is firmly attached to the lower portion of the cylindrical part 64. The tip 72 of the turned part 71 is provided with cut rings 72a, over which is covered with the second part of the two-part pyrotechnic compound 73 (e.g., red phosphorous).

A safety component 66, which is biased to stay in its upper most position as shown in FIG. 2 by the safety spring 67 (shown schematically as a heavy line), is positioned inside the cylinder 64, and is free to move up and down (axially) in the cylinder 64. As can be observed in FIG. 2, the cylindrical part 64 is locked to the housing 60 by setback locking balls 68. The setback locking balls 68 lock the cylindrical part 64 to the housing 60 through holes 69a provided on the cylindrical part 64 and the housing 60 and corresponding holes 69b on the housing 60. In the illustrated configuration, the safety component 66 is pressing the locking balls 68 against the cylindrical part 64 via the preloaded safety spring 67, and the flat portion 70 of the safety component 66 prevents the locking balls 68 from moving away from their aforementioned locking position. The flat portion 70 of the safety component 66 allows a certain amount of downward movement of the safety component 66 without releasing the locking balls 68 and thereby allowing downward movement of the cylindrical part 64. For relatively low axial acceleration levels or higher acceleration levels that last a very short amount of time, corresponding to accidental drops and other similar situations that cause safety concerns, the safety component 66 travels up and down without releasing the cylindrical part 64. However, once the firing acceleration profiles are experienced, the safety component 66 travels downward enough to release balls 68 from the holes 69b and thereby release the cylindrical part 64. Upon the release of the safety component 66 and appropriate level of acceleration for the cylindrical part 64 and all other components that ride with it to overcome the resisting force of the spring 65 and attain enough momentum, then it will cause impact between the two components 63 and 73 of the two-part pyrotechnic compound with enough strength to cause ignition of the pyrotechnic compound.

The aforementioned currently available inertial igniters have a number of shortcomings for use in thermal batteries, specifically, they are not useful for relatively small thermal batteries for munitions with the aim of occupying relatively small volumes, i.e., to achieve relatively small height total igniter compartment height 13, FIG. 1. Firstly, the currently available inertial igniters, such as that shown in FIG. 2, are relatively long thereby resulting in relatively long total igniter heights 13. Secondly, since the currently available igniters are not sealed and exhaust the ignition fire out from the sides, they have to be packaged in a housing 21, usually with other ignition material 23, thereby increasing the height 13 over the length of the igniter 20 (see FIG. 3). In addition, since the pyrotechnic materials of the currently available igniters 20 are not sealed inside the igniter, they are prone to damage by the elements and cannot usually be stored for long periods of time before assembly into the thermal batteries unless they are stored in a controlled environment.

SUMMARY OF THE INVENTION

A need therefore exists for novel miniature inertial igniters for thermal batteries used in gun fired munitions, particularly for small and low power thermal batteries that could be used in fuzing and other similar applications, thereby eliminating the need for external power sources. The innovative inertial igniters can be scalable to thermal batteries of various sizes, in particular to miniaturized igniters for small size thermal batteries. Such inertial igniters must be safe and in general and in particular they should not initiate if dropped, e.g., from up to 7 feet onto a concrete floor for certain applications; should withstand high firing accelerations, for example up to 20-50, 000 Gs; and should be able to be designed to ignite at specified acceleration levels when subjected to such accelerations for a specified amount of time to match the firing acceleration experienced in a gun barrel as compared to high G accelerations experienced during accidental falls which last over very short periods of time, for example accelerations of the order of 1000 Gs when applied for 5 msec as experienced in a gun as compared to for example 2000 G acceleration levels experienced during accidental fall over a concrete floor but which may last only 0.5 msec. Reliability is also of much concern since the rounds should have a shelf life of up to 20 years and could generally be stored at temperatures of sometimes in the range of −65 to 165 degrees F. This requirement is usually satisfied best if the igniter pyrotechnic is in a sealed compartment. The inertial igniters must also consider the manufacturing costs and simplicity in design to make them cost effective for munitions applications.

To ensure safety and reliability, inertial igniters should not initiate during acceleration events which may occur during manufacture, assembly, handling, transport, accidental drops, etc. Additionally, once under the influence of an acceleration profile particular to the firing of ordinance from a gun, the device should initiate with high reliability. In many applications, these two requirements often compete with respect to acceleration magnitude, but differ greatly in impulse. For example, an accidental drop may well cause very high acceleration levels—even in some cases higher than the firing of a shell from a gun. However, the duration of this accidental acceleration will be short, thereby subjecting the inertial igniter to significantly lower resulting impulse levels. It is also conceivable that the igniter will experience incidental low but long-duration accelerations, whether accidental or as part of normal handling, which must be guarded against initiation. Again, the impulse given to the miniature inertial igniter will have a great disparity with that given by the initiation acceleration profile because the magnitude of the incidental long-duration acceleration will be quite low.

Those skilled in the art will appreciate that the inertial igniters disclosed herein may provide one or more of the following advantages over prior art inertial igniters:

provide inertial igniters that are significantly shorter and smaller in volume than currently available inertial igniters for thermal batteries or the like, particularly relatively small thermal batteries to be used in munitions without occupying very large volumes;

provide inertial igniters that can be mounted directly onto the thermal batteries without a housing (such as housing 21 shown in FIG. 3), thereby allowing even a smaller total height and volume for the inertial igniter assembly;

provide inertial igniters that can directly initiate the pyrotechnics materials inside the thermal battery without the need for intermediate ignition material (such as the additional material 23 shown in FIG. 3) or a booster;

provide inertia igniters that could be constructed to guide the pyrotechnic flame essentially downward (in the direction opposite to the direction of the firing acceleration—usually for mounting on the top of the thermal battery as shown in FIG. 3), or essentially upward (in the direction opposite of the firing acceleration—usually for mounting at the bottom of the thermal battery), or essentially sidewise (lateral to the direction of the firing);

provide inertial igniters that allow the use of standard off-the-shelf percussion cap primers instead of specially designed pyrotechnic components; and provide inertial igniters that can be sealed to simplify storage and increase their shelf life.

Accordingly, inertial igniters and ignition systems for use with thermal batteries for producing power upon acceleration are provided.

BRIEF DESCRIPTION OF THE DRAWINGS

These and other features, aspects, and advantages of the apparatus of the present invention will become better understood with regard to the following description, appended claims, and accompanying drawings where:

FIG. 5a illustrates a schematic of the isometric drawing of a first embodiment of an inertial igniter together with the top cap of a thermal battery to which it is attached.

FIG. 5b illustrates a second view of the isometric drawing of the first embodiment of the inertial igniter of FIG. 5a showing the openings that are provided to exit the ignition sparks and flames into the thermal battery.

FIG. 5c illustrates a schematic of the isometric drawing of a first embodiment of an inertial igniter of FIG. 5a without the outer housing (side wall and top cap) of the inertial igniter.

FIG. 20a illustrates a top view and FIG. 20b illustrates an isometric view of a bottom plate and posts for a gang of three inertial igniters.

FIG. 21a illustrates a top view and FIG. 21b illustrates an isometric view of a bottom plate and posts for a variation of the gang of three inertial igniters of FIGS. 20a and 20b.

DETAILED DESCRIPTION OF THE PREFERRED EMBODIMENT

Figure 4:
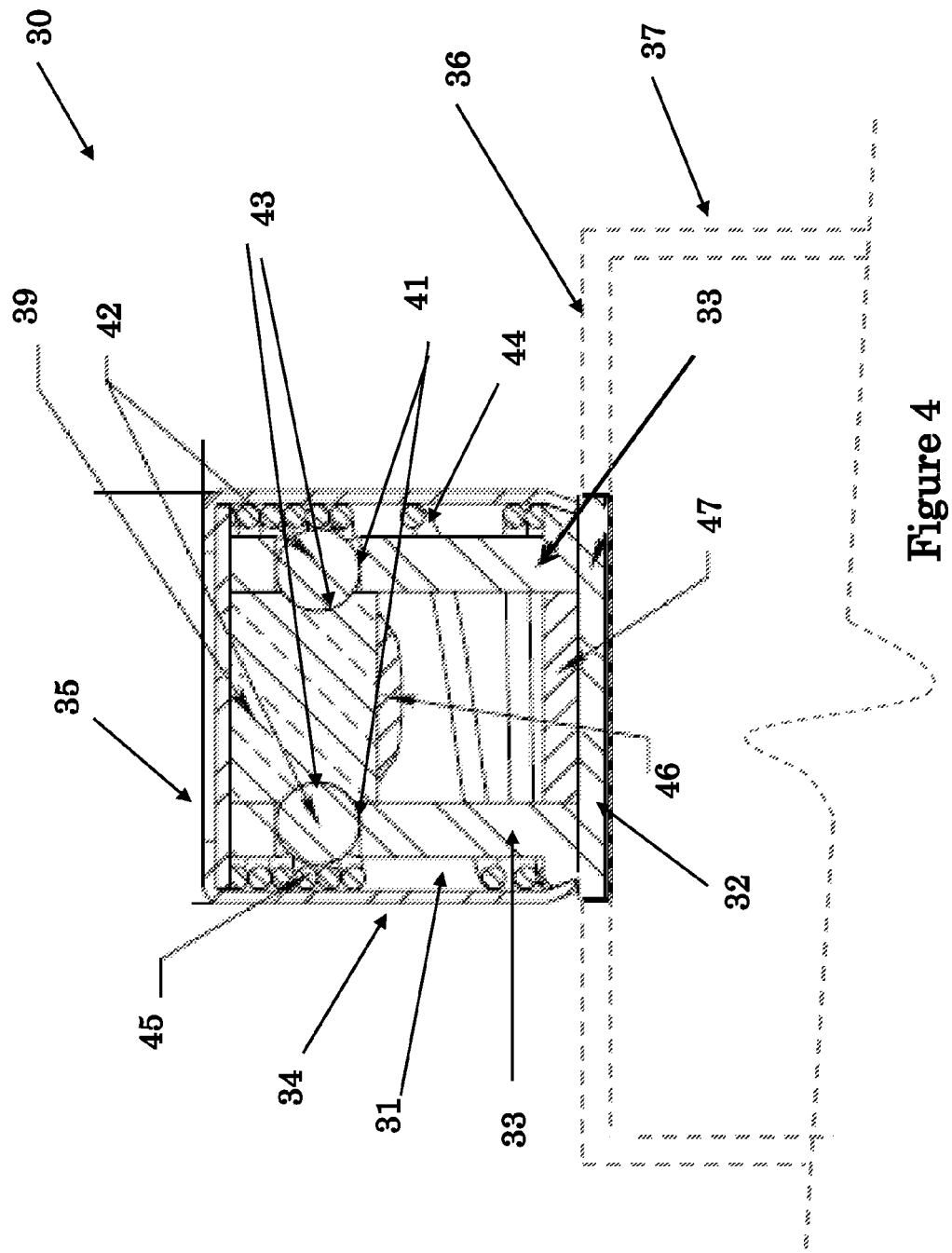
FIG. 4 illustrates a schematic of a cross-section of a first embodiment of an inertial igniter in a locked position.

A schematic of a cross-section of a first embodiment of an inertia igniter is shown in FIG. 4, referred to generally with reference numeral 30. The inertial igniter 30 is constructed with igniter body 31, consisting of a base 32 and at least two posts 33, and a housing wall 34. The base 32 and two posts 33, which may be integral or may have been constructed as separate pieces and joined together, for example by welding of press fitting or other methods commonly used in the art. In the schematic of FIG. 4, the igniter body 31 and the housing wall 34 are shown to be joined together at the base 32; however, the two components may be integrated as one piece and a separate top cap 35 may then be provided, which is then joined to the top surface of the housing 34 following assembly of the igniter (in the schematic of FIG. 4 the top cap 35 is shown as an integral part of the housing 34). In addition, the base of the housing 32 may be extended to form the cap 36 of the thermal battery 37, the top portion of which is shown with dashed lines in FIG. 4.

The inertial igniter 30 with the thermal battery top cap 36 is shown in the isometric drawings of FIGS. 5a and 5b. The inertial igniter without its housing 34 and top cap 35 is shown in the isometric drawing of FIG. 5c. The base of the housing 32 is also provided with at least one opening 38 (with corresponding openings in the thermal battery top cap 36) to allow the ignited sparks and fire to exit the inertial igniter into the thermal battery 37 upon initiation of the inertial igniter pyrotechnics 46 and 47, FIG. 4, or percussion cap primer when used in place of the pyrotechnics 46 and 47 (not shown).

A striker mass 39 is shown in its locked position in FIGS. 4 and 5c. The striker mass 39 is provided with vertical recesses 40 that are used to engage the posts 33 and serve as guides to allow the striker mass 39 to ride down along the length of the posts 33 without rotation with an essentially pure up and down translational motion. In its illustrated position in FIGS. 4 and 5c, the striker mass 39 is locked in its axial position to the posts 33 by at least one setback locking ball 42. The setback locking ball 42 locks the striker mass 39 to the posts 33 of the inertial igniter body 31 through the holes 41 provided in the posts 33 and a concave portion such as a dimple (or groove) 43 on the striker mass 39 as shown in FIG. 4. A setback spring 44 with essentially dead coil section 45, which is preferably in compression, is also provided around but close to the posts as shown in FIGS. 4 and 5c. In the configuration shown in FIG. 4, the locking balls 42 are prevented from moving away from their aforementioned locking position by the dead coil section 45 of the setback spring 44. The dead coil section 45 can ride up and down beyond the posts 33 as shown in FIGS. 4 and 5c, but is biased to stay in its upper most position as shown in the schematic of FIG. 4 by the setback spring 44.

In this embodiment, a two-part pyrotechnics compound is shown to be used, FIG. 4. One part of the two-part pyrotechnics compound 47 (e.g., potassium chlorate) is provided on the interior side of the base 32, preferably in a provided recess (not shown) over the exit holes 38. The second part of the pyrotechnics compound (e.g., red phosphorous) 46 is provided on the lower surface of the striker mass surface 39 facing the first part of the pyrotechnics compound 47 as shown in FIG. 4. The surfaces to which the pyrotechnic parts 46 and 47 are attached are roughened and/or provided with surface cuts, recesses, or the like as commonly used in the art (not shown) to ensure secure attachment of the pyrotechnics materials to the applied surfaces.

In general, various combinations of pyrotechnic materials may be used for this purpose. One commonly used pyrotechnic material consists of red phosphorous or nano-aluminum, indicated as element 46 in FIG. 4, and is used with an appropriate binder (such as vinyl alcohol acetate resin or nitrocellulose) to firmly adhere to the bottom surface of the striker mass 39. The second component can be potassium chlorate, potassium nitrate, or potassium perchlorate, indicated as element 47 in FIG. 4, and is used with a binder (preferably but not limited to with such as vinyl alcohol acetate resin or nitrocellulose) to firmly attach the compound to the surface of the base 32 (preferably inside of a recess provided in the base 32—not shown) as shown in FIG. 4.

Figure 6:
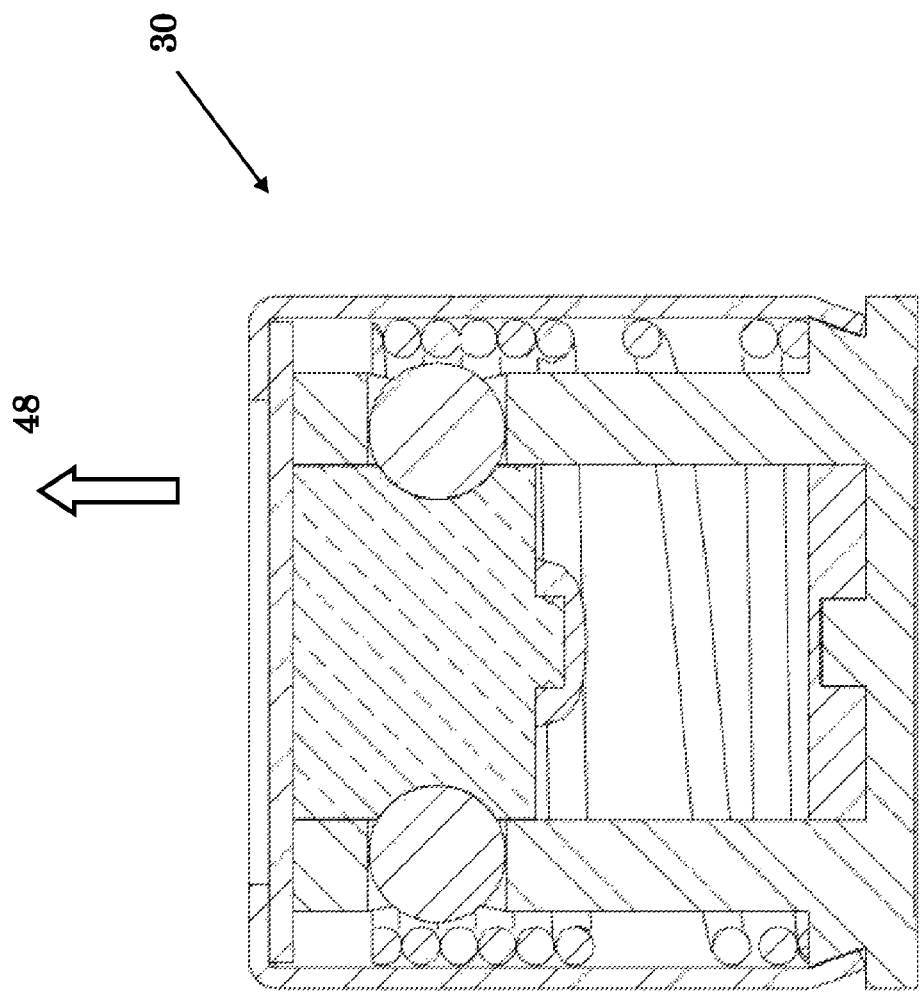
FIG. 6 illustrates the inertial igniter of FIG. 4 upon a non-firing accidental acceleration.

The basic operation of the disclosed inertial igniter 30 will now be described with reference to FIGS. 4-8. Any non-trivial acceleration in the axial direction 48 which can cause dead coil section 45 to overcome the resisting force of the setback spring 44 will initiate and sustain some downward motion of only the dead coil section 45. The force due to the acceleration on the striker mass 39 is supported at the dimples 43 by the locking balls 42 which are constrained inside the holes 41 in the posts 33. If an acceleration time in the axial direction 48 imparts a sufficient impulse to the dead coil section 45 (i.e., if an acceleration time profile is greater than a predetermined threshold), it will translate down along the axis of the assembly until the setback locking balls 42 are no longer constrained to engage the striker mass 39 to the posts 33 of the housing 31. If the acceleration event is not sufficient to provide this motion (i.e., the acceleration time profile provides less impulse than the predetermined threshold), the dead coil section 45 will return to its start (top) position under the force of the setback spring 44. The schematic of the inertial igniter 30 with the dead coil section 45 moved down certain distance d1 as a result of an acceleration event, which is not sufficient to unlock the striker mass 39 from the posts 33 of the housing 31, is shown in FIG. 6.

Figure 7:
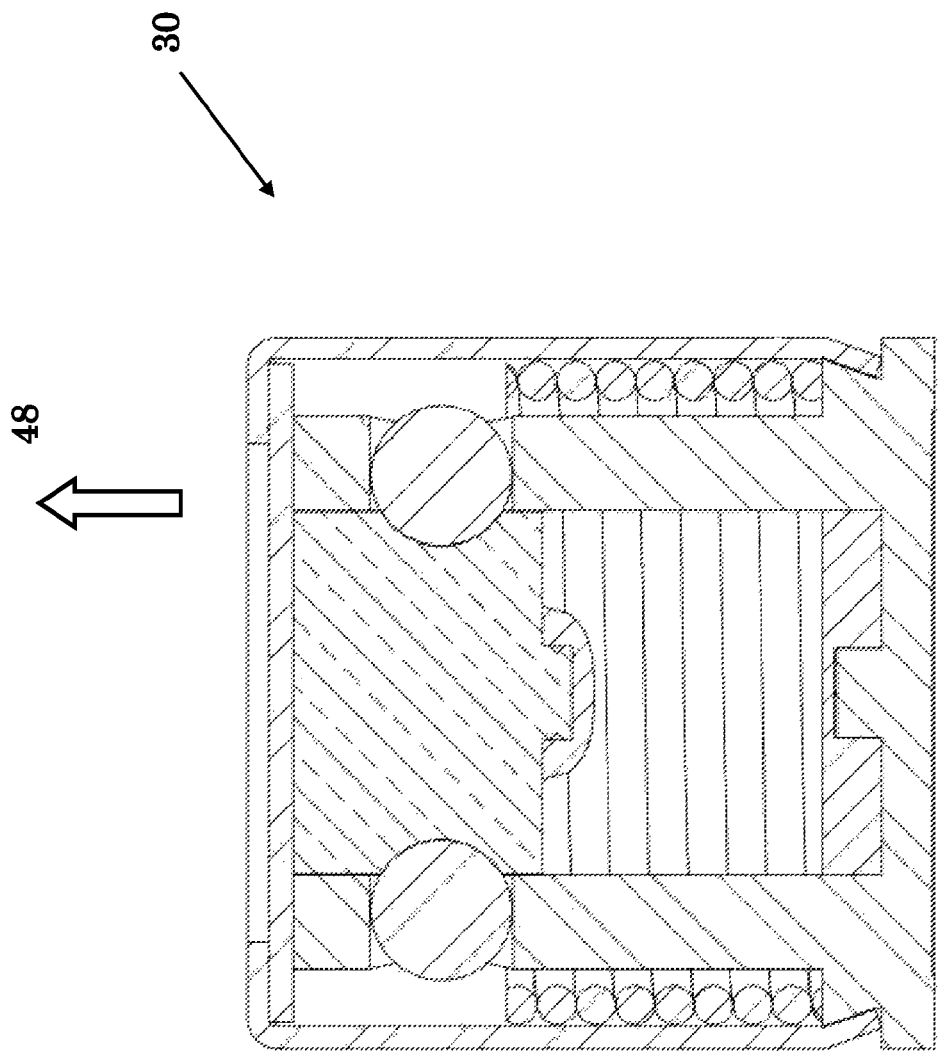
FIG. 7 illustrates the inertial igniter of FIG. 4 upon a firing acceleration.
Figure 8:
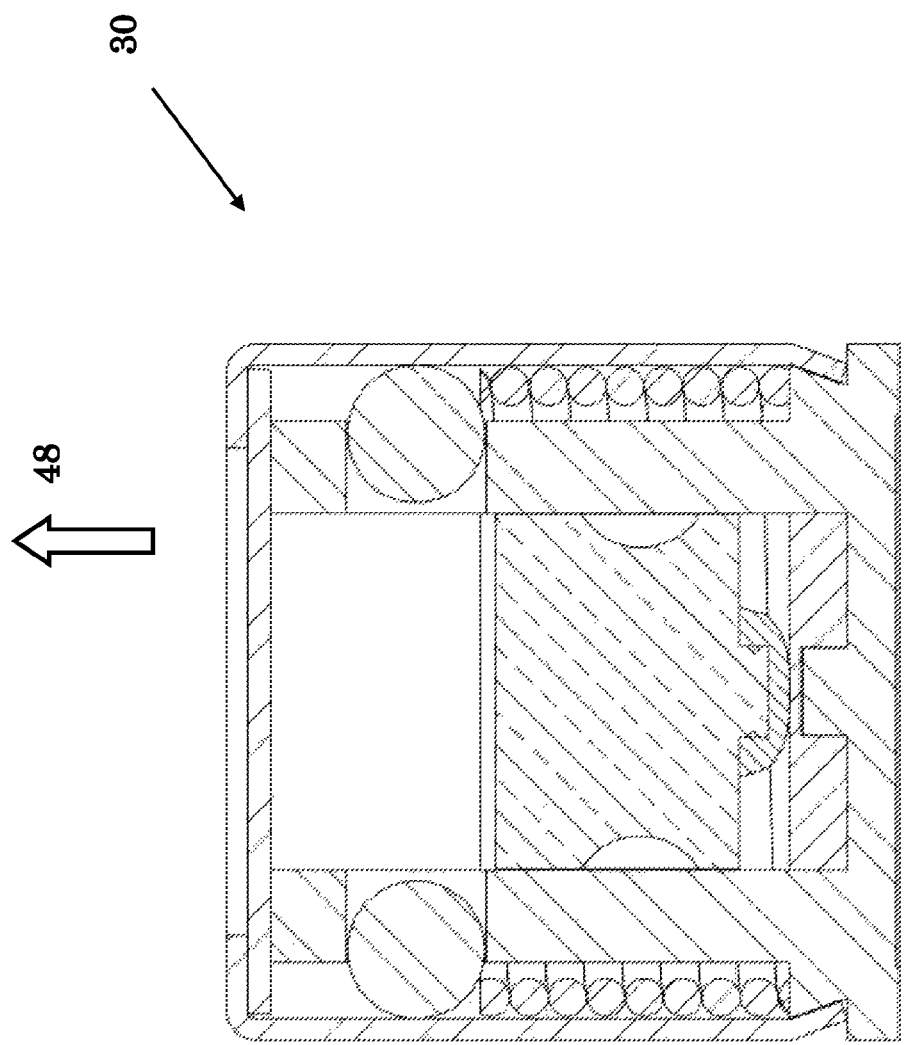
FIG. 8 illustrates the inertial igniter of FIG. 4 upon the striker mass impacting base, causing the initiation of ignition of the two-part pyrotechnic compound.

Assuming that the acceleration time profile was at or above the specified "all-fire" profile, the dead coil section 45 will have translated down full-stroke d2, allowing the striker mass 39 to accelerate down towards the base 32. In such a situation, since the locking balls 42 are no longer constrained by the dead coil section 45, the downward force that the striker mass 39 has been exerting on the locking balls 42 will force the locking balls 42 to move outward in the radial direction. Once the locking balls 42 are out of the way of the dimples 43, the downward motion of the striker mass 39 is impeded only by the elastic force of the setback spring 44, which is easily overcome by the impulse provided to the striker mass 39. As a result, the striker mass 39 moves downward, causing the parts 46 and 47 of the two-part pyrotechnic compound to strike with the requisite energy to initiate ignition. The configuration of the inertial igniter 30 when the balls 42 are free to move outward in the radial direction, thereby releasing the striker mass 39 is shown in the schematic of FIG. 7. The configuration of the inertial igniter 30 when the part 46 of the two-part pyrotechnic compound is striking the part 47 is shown in the schematic of FIG. 8.

In another embodiment, the dead coil section 45 may be constructed as a separate collar and positioned similarly over the setback spring 44. The collar replacing the dead coil section 45 may also be attached to the top coil of the setback spring 44, e.g., by welding, brazing, or adhesives such as epoxy, or the like. The advantage of attaching the collar to the top of the setback spring 44 is that it would help prevent it to get struck over the posts 33 as it is being pushed down by the applied acceleration in the direction of the arrow 48, FIGS. 6-8.

Alternatively, the dead coil section 45 and the setback spring 44 may be integral, made out of, for example, a cylindrical section with spiral or other type shaped cuts over its lower section to provide the required axial flexibility to serve the function of the setback spring 44. The upper portion of this cylinder is preferably left intact to serve the function of the dead coil section 45, FIGS. 6-8.

It is appreciated by those skilled in the art that by varying the mass of the striker 39, the mass of the dead coil section 45, the spring rate of the setback spring 44, the distance that the dead coil section 45 has to travel downward to release the locking balls 42 and thereby release the striker mass 39, and the distance between the parts 46 and 47 of the two-part pyrotechnic compound, the designer of the disclosed inertial igniter 30 can match the fire and no-fire impulse level requirements for various applications as well as the safety (delay or dwell action) protection against accidental dropping of the inertial igniter and/or the munitions or the like within which it is assembled.

Briefly, the safety system parameters, i.e., the mass of the dead coil section 45, the spring rate of the setback spring 44 and the dwell stroke (the distance that the dead coil section 44 has to travel downward to release the locking balls 42 and thereby release the striker mass 39) must be tuned to provide the required actuation performance characteristics. Similarly, to provide the requisite impact energy, the mass of the striker 39 and the separation distance between the parts 46 and 47 of the two-part pyrotechnic compound must work together to provide the specified impact energy to initiate the pyrotechnic compound when subjected to the remaining portion of the prescribed initiation acceleration profile after the safety system has been actuated.

Figure 2:
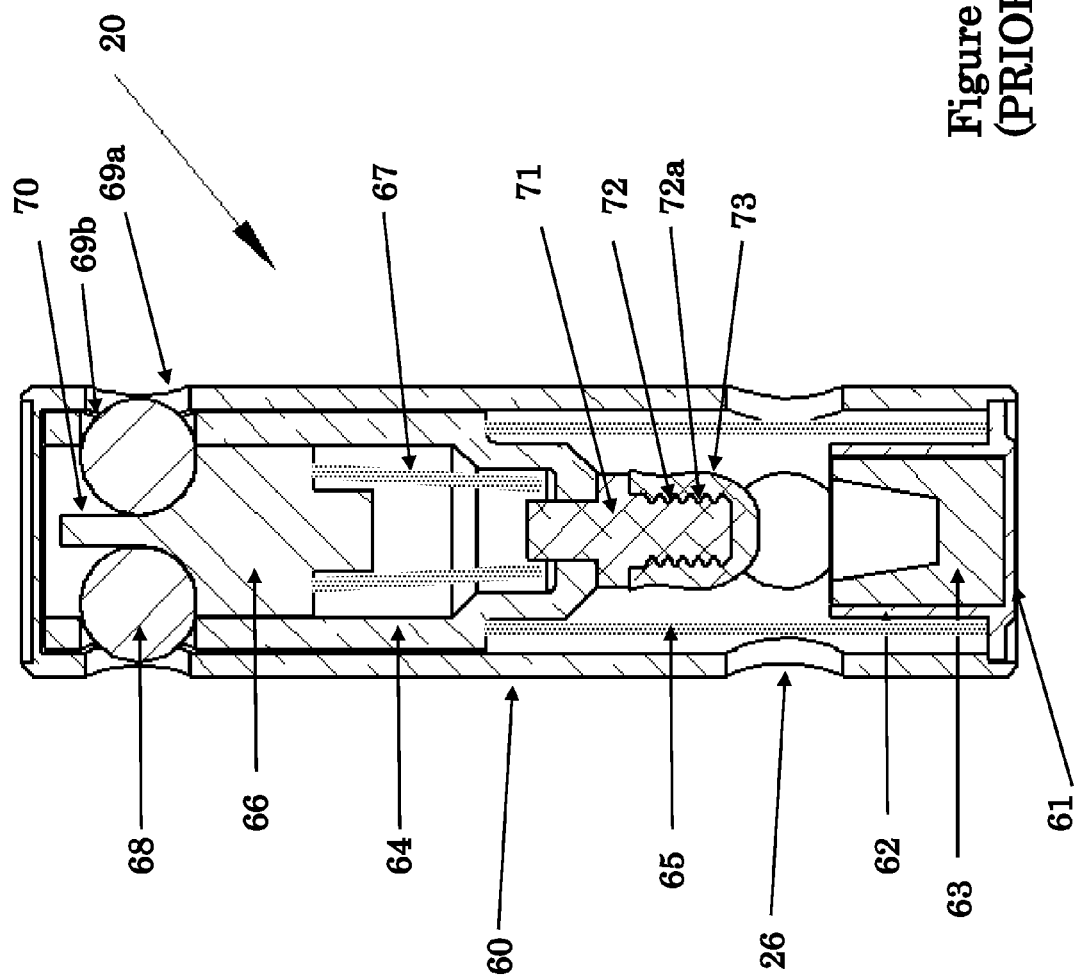
FIG. 2 illustrates a schematic of a cross-section of a conventional inertial igniter assembly known in the art.

In addition, since the safety and striker systems each require a certain actuation distance to achieve the necessary performance, the most axially compact design is realized by nesting the two systems in parallel as it is done in the embodiment of FIG. 4. It is this nesting of the two safety and striker systems that allows the height of the disclosed inertial igniter to be significantly shorter than the currently available inertial igniter design (as shown in FIG. 2), in which the safety and striker systems are configured in series. In fact, an initial prototype of the disclosed inertial igniter 30 has been designed to the fire and no-fire and safety specifications of the currently available inertial igniter shown in FIG. 2 and has achieved height and volume reductions of over 60 percent. It is noted that by optimizing the parameters of the disclosed inertial igniter, both height and volume can be further reduced.

Figure 9:
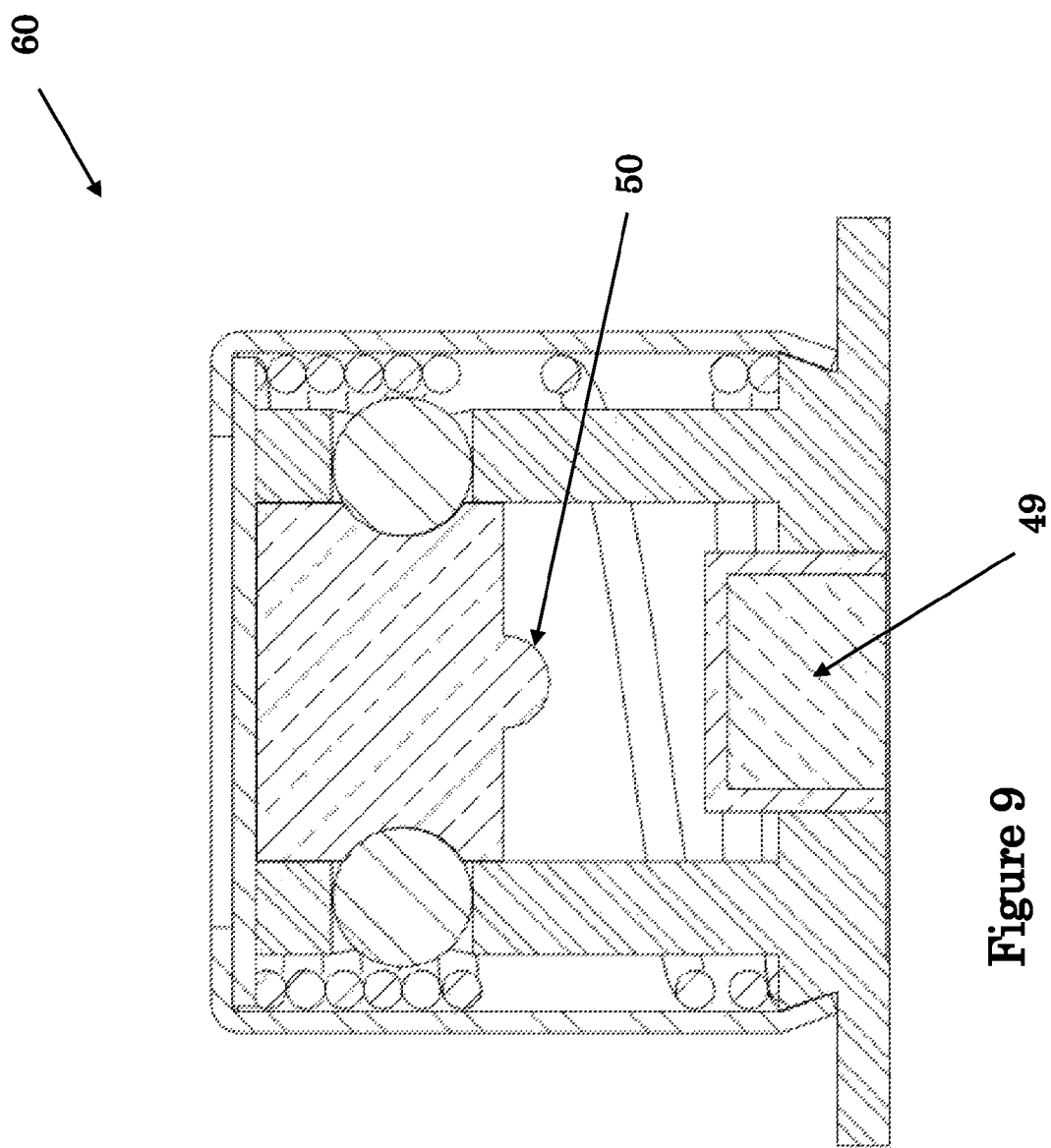
FIG. 9 illustrates a schematic of a cross-section of a second embodiment of an inertial igniter in a locked position.

In another embodiment, the two-part pyrotechnics 46 and 47, FIG. 4, are replaced by a percussion cap primer 49 attached to the base 32 of the inertial igniter 60 and a striker tip 50 as shown in the schematic of a cross-section of FIG. 9. In this illustration, all components are the same as those shown in FIG. 4 with the exception of replacing the percussion cap primer 49 and the striker tip 50 with striker assembly. The striker tip 50 is firmly attached to the striker mass 39.

The striker mass 39 and striker tip 50 may be a monolithic design with the striking tip 50 being a machined boss protruding from the striker mass, or the striker tip 50 may be a separate piece pressed or otherwise permanently fixed to the striker mass. A two-piece design would be favorable to the need for a striker whose density is different than steel, but whose tip would remain hard and tough by attaching a steel ball, hemisphere, or other shape to the striker mass. A monolithic design, however, would be generally favorable to manufacturing because of the reduction of part quantity and assembly operations.

An advantage of using the two component pyrotechnic materials as shown in FIG. 4 is that these materials can be selected such that ignition is provided at significantly lower impact forces than are required for commonly used percussion cap primers. As a result, the amount of distance that the striker mass 39 has to travel and its required mass is thereby reduced, resulting in a smaller total height (shown as 15 in FIG. 1) of the thermal battery assembly. This choice, however, has the disadvantage of not using standard and off-the-shelf percussion cap primers, thereby increasing the component and assembly cost of the inertial igniter.

Figure 3:
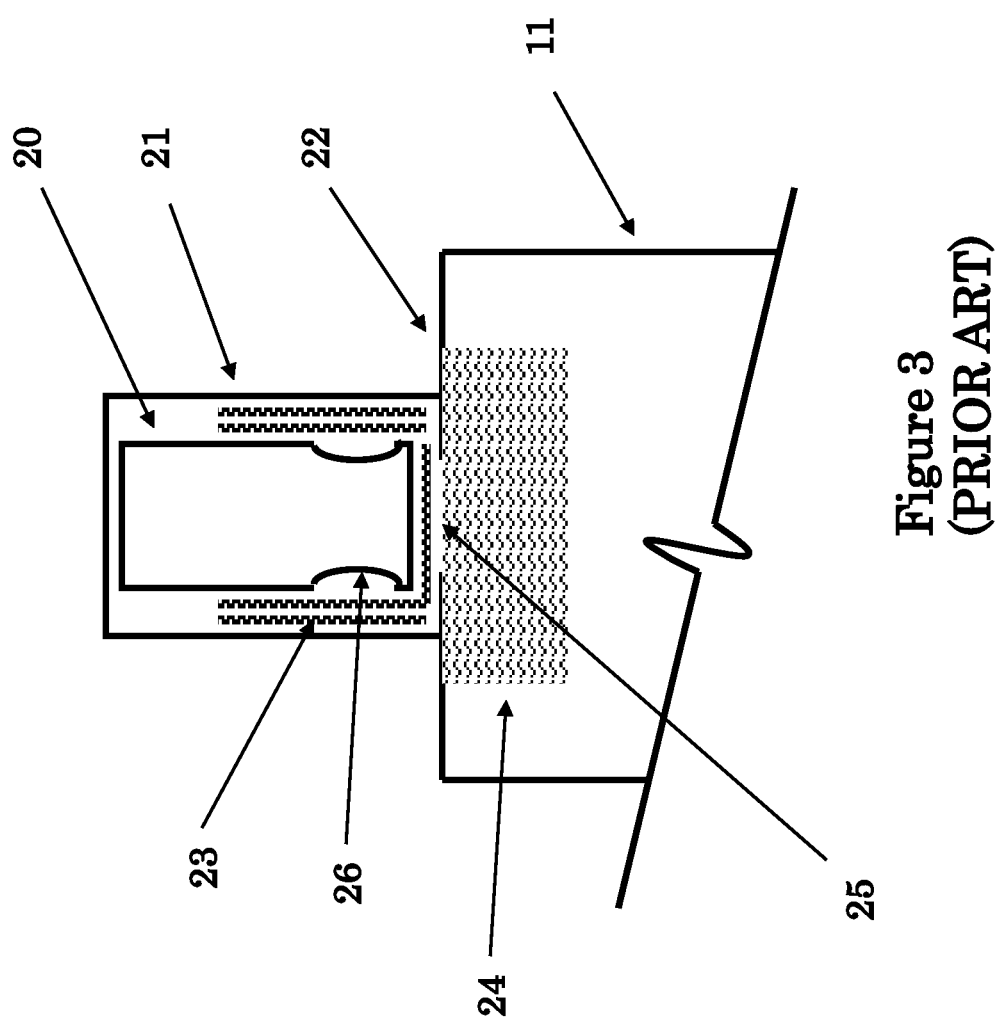
FIG. 3 illustrates a schematic of a cross-section of a conventional inertial igniter assembly known in the art positioned within a housing and having intermediate materials for ignition.

The disclosed inertial igniters are seen to discharge the ignition fire and sparks directly into the thermal battery, FIGS. 4-9, to ignite the pyrotechnic materials 24 within the thermal battery 11 (FIG. 3). As a result, the additional housing 21 and ignition material 23 shown in FIG. 3 can be eliminated, greatly simplifying the resulting thermal battery design and manufacture. In addition, the total height 13 and volume of the inertial igniter assembly 10 and the total height 15 of the complete thermal battery assembly 16 are reduced, thereby reducing the total volume that has to be allocated in munitions or the like to house the thermal battery.

The disclosed inertial igniters are shown sealed within their housing, thereby simplifying their storage and increase their shelf life.

Figure 10:
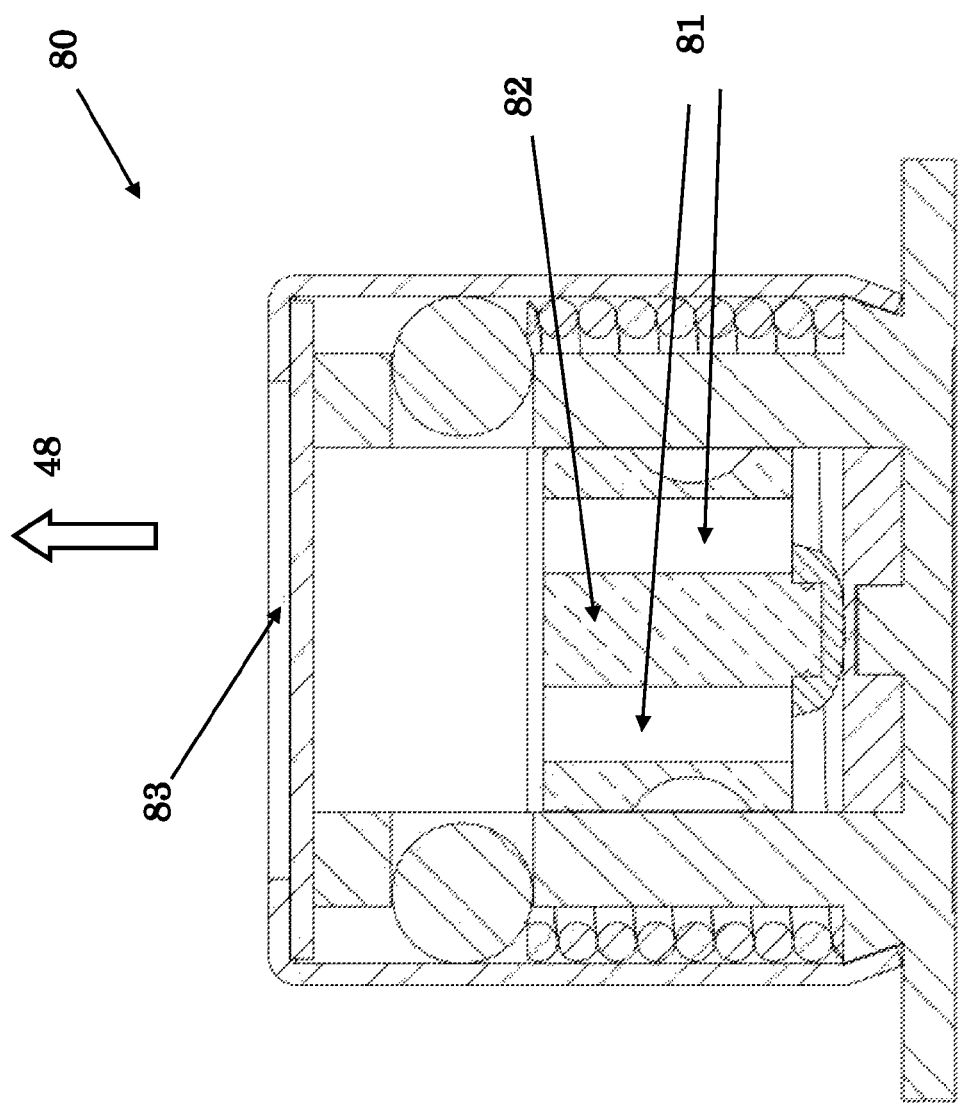
FIG. 10 illustrates a schematic of a cross-section of a third embodiment of an inertial igniter in initiation position.

FIG. 10 shows the schematic of a cross-section of another embodiment 80. This embodiment is similar to the embodiment shown in FIGS. 4-8, with the difference that the striker mass 39 (FIGS. 4-8) is replaced with a striker mass 82, with at least one opening passage 81 to guide the ignition flame up through the igniter 80 to allow the pyrotechnic materials (or the like) of a thermal battery (or the like) positioned above the igniter 80 (not shown) to be initiated. In addition, the top cap 35 (FIG. 4-8) is preferably eliminated or replaced by a cap 83 with appropriately positioned openings to allow the flames to enter the thermal battery and initiate its pyrotechnic materials. The openings 38 (FIG. 5b) are obviously no longer necessary.

Figure 11B:
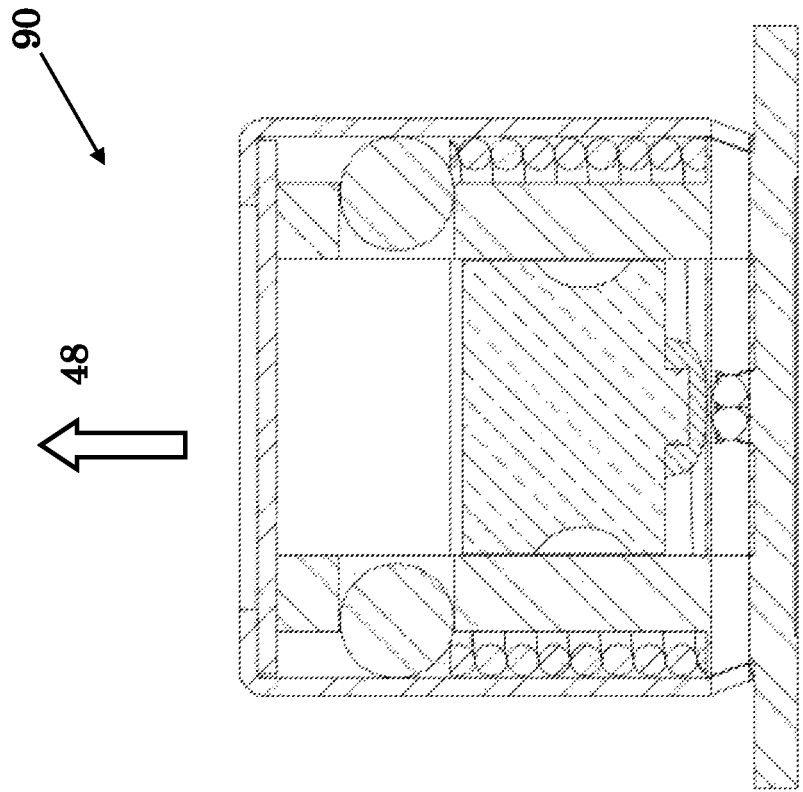
FIGS. 11a and 11b illustrate an isometric and a schematic of a cross-section, respectively, of a fourth embodiment of an inertial igniter in initiation position.

FIG. 11b shows the schematic of a cross-section of another embodiment 90. This embodiment is similar to the embodiment shown in FIGS. 4-8, with the difference that the openings 38 (FIG. 5b) for the flame to exit the igniter 30 is replaced with side openings 91, FIG. 11a, to allow the flame to exit from the side of the igniter to initiate the pyrotechnic materials (or the like) of a thermal battery or the like (not shown) that is positioned around the body of the igniter 90. Alternatively, the igniter housing 92 may be eliminated, thereby allowing the generated ignition flames to directly flow to the sides of the igniter 90 and initiate the pyrotechnic materials of the thermal battery or the like.

Figure 12:
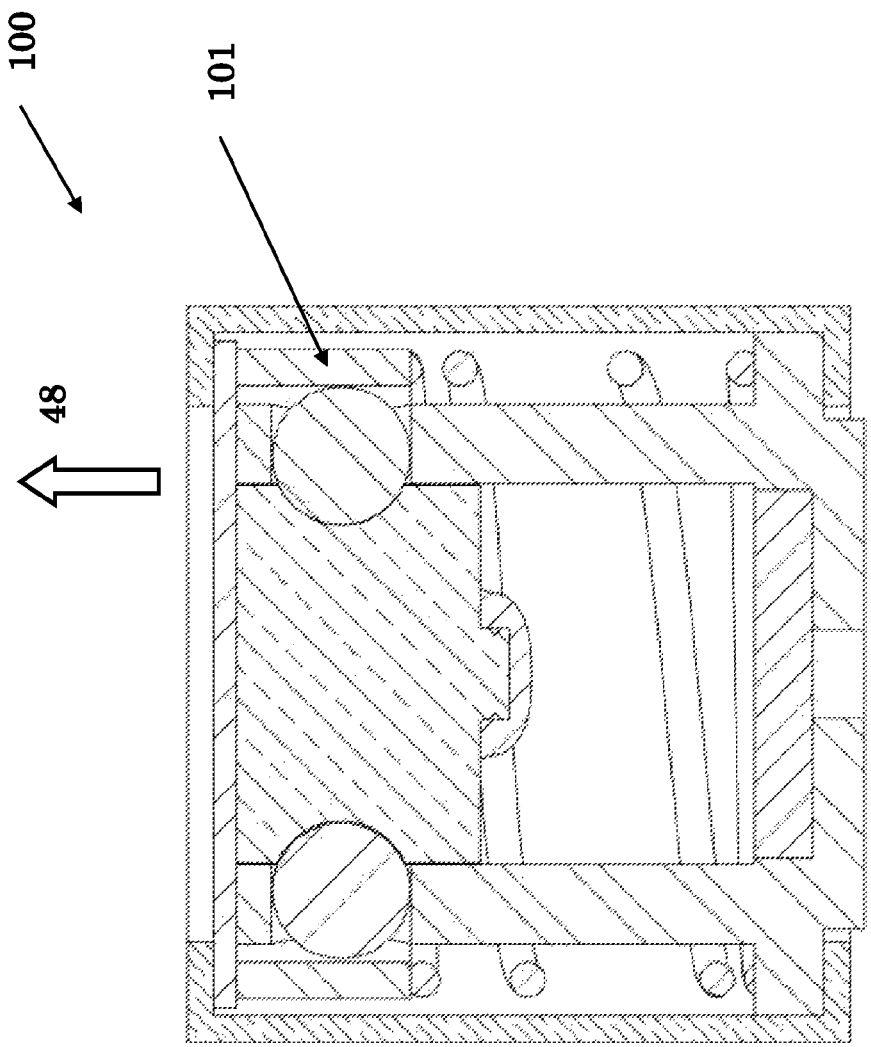
FIG. 12 illustrates a schematic of a cross-section of a fifth embodiment of an inertial igniter in a locked position.

FIG. 12 shows the schematic of a cross-section of another embodiment 100. This embodiment is similar to the embodiment shown in FIGS. 4-8, with the difference that the dead coil section 45 (FIGS. 4-5) is replaced with a solid, preferably relatively very rigid, cylindrical section 101. The advantage of using a rigid cylindrical section 101 is that the balls 42 (FIGS. 4-5) would not tend to cause the individual coils of the dead coil section 45 to move away from their cylindrically positioned configuration, thereby increasing the probability that the dead coil section could get stuck by the friction forces due to the pressure exerted by the balls 42 to the interior of the housing 34 (FIG. 4) or other similar possible scenarios.

In certain applications, the required reliability levels for initiation of inertial igniters are extremely high. In certain cases, the igniters should be designed and manufactured to perform their function with extremely high reliability of nearly 100 percent. Some cases may even require the use of multiple and redundant inertial igniters to obtain nearly 100 percent reliability.

The cost issue is also another important consideration since in small thermal batteries that have to be initiated by inertial igniters, the cost of inertial igniters may easily be a significant portion of the total cost. However, to significantly reduce the cost, inertial igniters have to be designed with fewer and easy to manufacture parts and be easy to assemble. In addition, the inertial igniters must use mass produced and commercially available parts.

The embodiments of the inertial igniters disclosed below are to provide the aforementioned advantages of the embodiments shown in FIGS. 4-12 and in addition: (1) provide inertial igniters that are significantly more reliable and easy to manufacture than currently available inertial igniters for thermal batteries or the like, particularly for relatively small thermal batteries that are used in munitions; (2) provide highly reliable and at the same time very small inertial igniters that do not occupy a significant volumes of small thermal batteries; (3) provide inertial igniters that are easy to manufacture and assemble into thermal batteries; and (4) provide inertial igniters that are readily modified to satisfy a wide range of no-fire and all-fire requirements without requiring costly engineering development and manufacturing equipment changes.

A need exists for novel miniature inertial igniters for thermal batteries used in gun fired munitions, that are extremely reliable, low cost (such as having fewer easy to manufacture parts that are not required to be fabricated to very low tolerances), easy to manufacture and assemble, and easy to assemble into a thermal battery (such as simply "drop-in" component during thermal battery assembly). Such inertial igniters can also be adaptable to a wide range of all-fire and no-fire requirements without requiring a significant amount of engineering development and testing. Such inertial igniters can also be capable of allowing multiple inertial igniters to be readily packed into thermal batteries as redundant initiators to further increase initiation reliability when such extremely high initiation reliability are warranted. Such inertial igniters are particularly needed for small and low power thermal batteries that could be used in fuzing and other similar applications. Such inertial igniters must be safe and in general and in particular they should not initiate if dropped, e.g., from up to 5-7 feet onto a concrete floor for certain applications; should withstand high firing accelerations and do not cause damage to the thermal battery, for example up to 20-50,000 Gs or even more; and should be able to be designed to ignite at specified acceleration levels when subjected to such accelerations for a specified amount of time to match the firing acceleration experienced in a gun barrel as compared to high G accelerations experienced during accidental falls which last for very short periods of time, for example accelerations of the order of 1000 Gs when applied for over 5 msec as experienced in a gun as compared to, for example 2000 G acceleration levels experienced during accidental fall over a concrete floor but which may last only 0.5 msec. Reliability is also of much concern since the rounds should have a shelf life of up to 20 years and could generally be stored at temperatures of sometimes in the range of −65 to 165 degrees F. This requirement is usually satisfied best if the igniter pyrotechnic is in a sealed compartment.

Figure 11A:
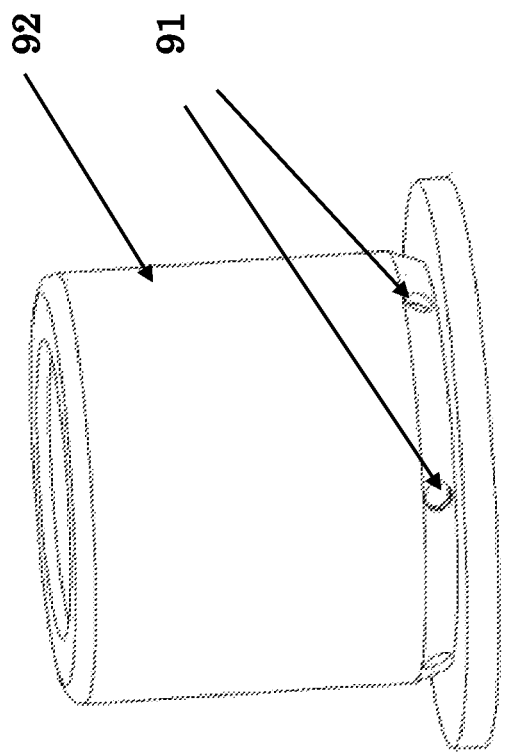
Figure 13:
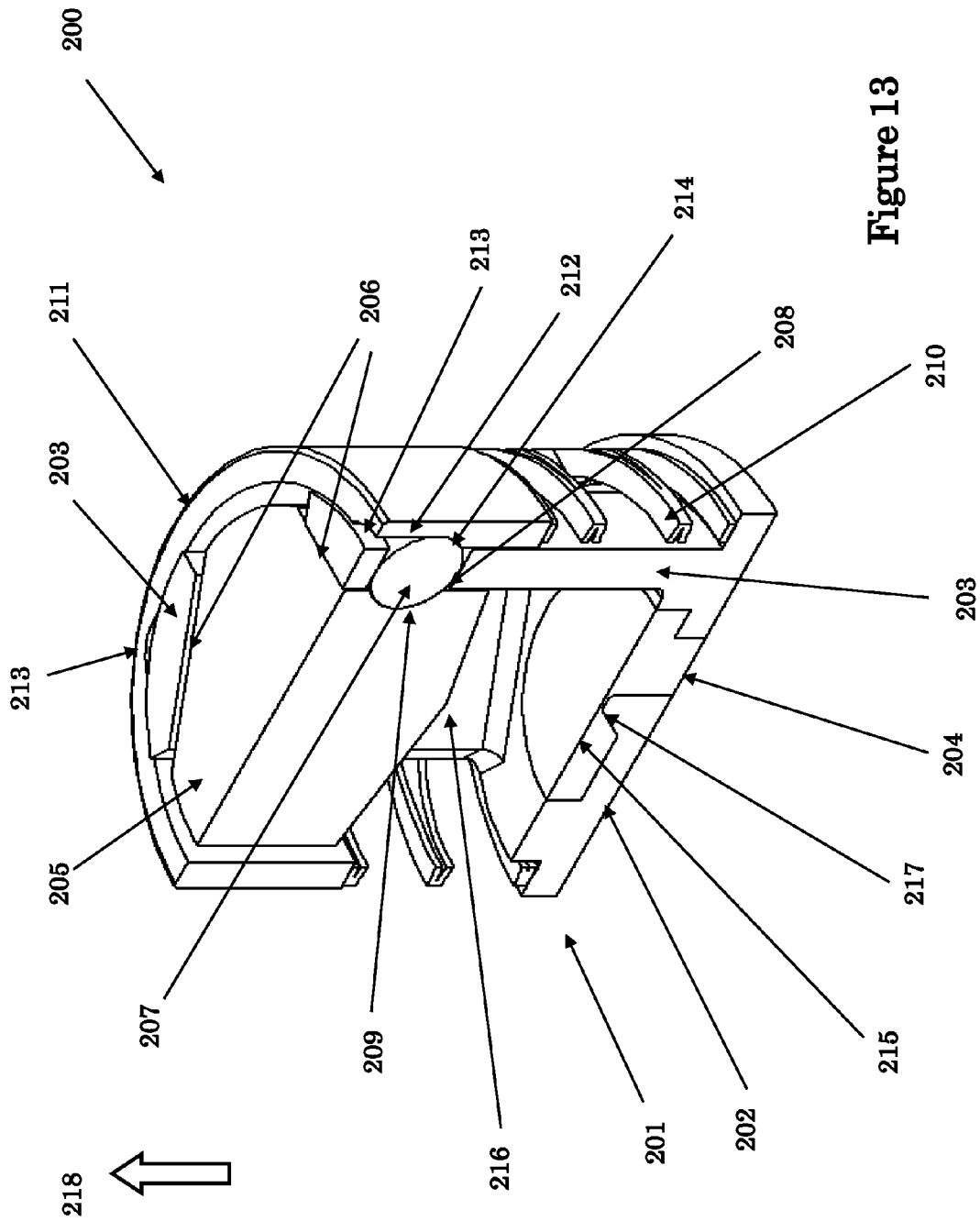
FIG. 13 illustrates an isometric cut away view of a sixth embodiment of an inertial igniter.
Figure 14:
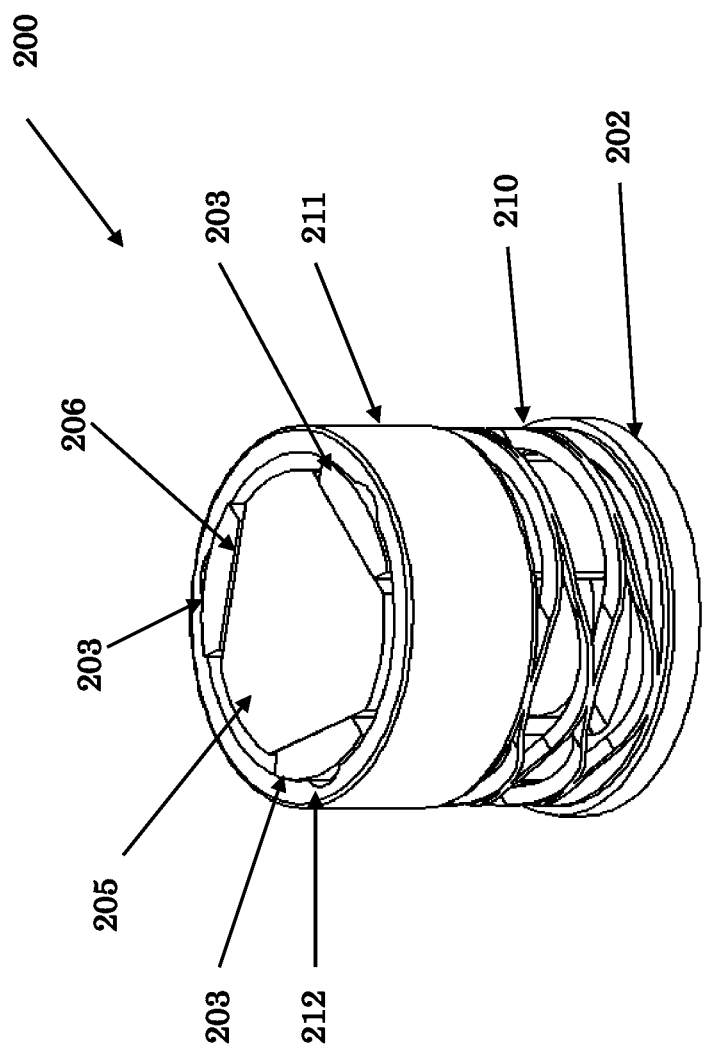
FIG. 14 illustrates a full isometric view of the inertial igniter of FIG. 13.

An isometric cross-sectional view of a sixth embodiment of an inertia igniter is shown in FIG. 13, referred to generally with reference numeral 200. The full isometric view of the inertial igniter 200 is shown in FIG. 14. The inertial igniter 200 is constructed with igniter body 201, consisting of a base 202 and at least three posts 203. The base 202 and the at least three posts 203, can be integrally formed as a single piece but may also be constructed as separate pieces and joined together, for example by welding or press fitting or other methods commonly used in the art. The base 202 of the housing can also be provided with at least one opening 204 (with a corresponding opening(s) in the thermal battery—not shown) to allow ignited sparks and fire to exit the inertial igniter and enter into the thermal battery positioned under the inertial igniter 200 upon initiation of the inertial igniter pyrotechnics 215, or percussion cap primer when used in place of the pyrotechnics, similar to the primer 49 in the embodiment 60 shown in FIG. 9. Although illustrated with the opening 204 in the base, the opening (or openings) can alternatively be formed in a side wall as is shown in FIG. 11a or in the striker mass as is shown in FIG. 10.

The base 202 of the housing may be extended to form a cap for the thermal battery, similar to the cap 36 of the thermal battery 37 shown for the embodiment 30 in FIGS. 4 and 5.

A striker mass 205 is shown in its locked position in FIG. 13. The striker mass 205 is provided with guides for the posts 203, such as vertical surfaces 206 (which may be recessed as shown in the embodiment 30 in FIGS. 4 and 5), that are used to engage the corresponding (inner) surfaces of the posts 203 and serve as guides to allow the striker mass 205 to ride down along the length of the posts 203 without rotation with an essentially pure up and down translational motion. However, the surfaces 206 minimize the chances of the striker mass 205 jamming as compared to the recesses 40. Further, manufacturing precision is reduced (for both the posts 203 and the striker mass 205) when the surfaces 206 are used in place of the recesses 40. Consequently, both the striker mass 205 and the inertial igniter structure (which includes the posts 203) is easier to produce and less costly when the surfaces 206 are used in place of the recesses 40.

In its illustrated position in FIGS. 13 and 14, the striker mass 205 is locked in its axial position to the posts 203 by at least one setback locking ball 207. The setback locking ball 207 locks the striker mass 205 to the posts 203 of the inertial igniter body 201 through the holes 208 provided in the posts 203 and a concave portion such as a dimple (or groove) 209 on the striker mass 205 as shown in FIG. 13. A setback spring 210, which is preferably in compression, is also provided around but close to the posts 203 as shown in FIGS. 13 and 14. In the configuration shown in FIG. 13, the locking balls 207 are prevented from moving away from their aforementioned locking position by the collar 211. The setback spring 210 can be a wave spring with rectangular cross-section. The rectangular cross-section eliminates the need to fix or otherwise retain the striker spring 210 to the collar 211, which is an expensive process; the flat coil spring surfaces minimizes the chances of coils slipping laterally (perpendicular to the direction of acceleration 218), which can cause jamming and prevent the release of the striker mass 205 (preventing the collar to move down enough to release the locking balls). Furthermore, wave springs generate friction between the waves at contact points along the spring wire, thereby reducing the chances for the collar 211 to rapidly bounce back up and preventing the striker mass 205 from being released.

The collar 211 is preferably provided with partial guide 212 ("pocket"), which are open on the top as indicated by the numeral 213. The guide 212 may be provided only at the location of the locking balls 207 as shown in FIGS. 13 and 14, or may be provided as an internal surface over the entire inner surface of the collar 211 (not shown). The advantage of providing local guides 212 is that it results in a significantly larger surface contact between the collar 211 and the outer surfaces of the posts 203, thereby allowing for smoother movement of the collar 211 up and down along the length of the posts 203. In addition, they prevent the collar 211 from rotating relative to the inertial igniter body 201 and makes the collar stronger and more massive. The advantage of providing a continuous inner recess guiding surface for the locking balls 207 is that it would require fewer machining processes during the collar manufacture. Although only one locking ball 207 is illustrated in FIG. 13, more than one can be provided, such as a locking ball 207 associated with each post 203. More than one locking ball 207 can also be associated with each post 203.

The collar 211 rides up and down on the posts 203 as can be seen in FIGS. 13 and 14, but is biased to stay in its upper most position as shown in FIGS. 13 and 14 by the setback spring 210. The guides 212 are provided with bottom ends 214, so that when the inertial igniter is assembled as shown in FIGS. 13 and 14, the setback spring 210 which is biased (preloaded) to push the collar 211 upward away from the igniter base 201, would "lock" the collar 211 in its uppermost position against the locking balls 207. As a result, the assembled inertial igniter 200 stays in its assembled state and would not require a top can (similar to the top cap 35 in the embodiment 30 of FIG. 4) to prevent the collar 211 from being pushed up and allowing the locking balls 207 from moving out and releasing the striker mass 205.

In the sixth embodiment, a one part pyrotechnics compound 215 (such as lead styphnate or other similar compound) can be used as shown in FIG. 13. The surfaces to which the pyrotechnic compound 215 is attached can be roughened and/or provided with surface cuts, recesses, projections, or the like and/or treated chemically as commonly done in the art (not shown) to ensure secure attachment of the pyrotechnics material to the applied surfaces. The use of one part pyrotechnics compound makes the manufacturing and assembly process much simpler and thereby leads to lower inertial igniter cost. The striker mass can be provided with a relatively sharp tip 216 and the igniter base surface 202 is provided with a protruding tip 217 which is covered with the pyrotechnics compound 215, such that as the striker mass is released during an all-fire event and is accelerated down (opposite to the arrow 218 illustrated in FIG. 13), impact occurs mostly between the surfaces of the tips 216 and 217, thereby pinching the pyrotechnics compound 215, thereby providing the means to obtain a reliable initiation of the pyrotechnics compound 215.

Alternatively, a two-part pyrotechnics compound as shown and described for the embodiment 30 of FIG. 4 can be used. One part of the two-part pyrotechnics compound 47 (FIG. 4), e.g., potassium chlorate, can be provided on the interior side of the base 32, such as in a provided recess (not shown) over the exit holes 38. The second part of the pyrotechnics compound (e.g., red phosphorous) 46 can be provided on the lower surface of the striker mass surface 39 facing the first part of the pyrotechnics compound 47, as shown in FIG. 4. In general, various combinations of pyrotechnic materials can be used for this purpose. One commonly used pyrotechnic material consists of red phosphorous or nano-aluminum, indicated as element 46 in FIG. 4, and is used with an appropriate binder (such as vinyl alcohol acetate resin or nitrocellulose) to firmly adhere to the bottom surface of the striker mass 39. The second component can be potassium chlorate, potassium nitrate, or potassium perchlorate, indicated as element 47 in FIG. 4, and is used with a binder (such as, but not limited to vinyl alcohol acetate resin or nitrocellulose) to firmly attach the compound to the surface of the base 32 (such as inside of a recess provided in the base 32—not shown) as shown in FIG. 4.

Alternatively, instead of using the pyrotechnics compound 215, FIG. 13, a percussion cap primer or the like (similar to the percussion cap primer 49 used in the embodiment 60 of FIG. 9) can be used. A striker tip (similar to the striker tip 50 shown in FIG. 9 for the embodiment 60) can be provided at the tip 216 of the striker mass 205 (not shown) to facilitate initiation upon impact.

The basic operation of the embodiment 200 of the inertial igniter of FIGS. 13 and 14 is similar to that of embodiment 30 (FIGS. 4-8) as previously described. Here again, any non-trivial acceleration in the axial direction 218 which can cause the collar 211 to overcome the resisting force of the setback spring 210 will initiate and sustain some downward motion of the collar 211. The force due to the acceleration on the striker mass 205 is supported at the dimples 209 by the locking balls 207 which are constrained inside the holes 208 in the posts 203. If an acceleration time in the axial direction 218 imparts a sufficient impulse to the collar 211 (i.e., if an acceleration time profile is greater than a predetermined threshold), it will translate down along the axis of the assembly until the setback locking balls 205 are no longer constrained to engage the striker mass 205 to the posts 203. If the acceleration event is not sufficient to provide this motion (i.e., the acceleration time profile provides less impulse than the predetermined threshold), the collar 211 will return to its start (top) position under the force of the setback spring 210.

Assuming that the acceleration time profile was at or above the specified "all-fire" profile, the collar 211 will have translated down past the locking balls 207, allowing the striker mass 205 to accelerate down towards the base 202. In such a situation, since the locking balls 207 are no longer constrained by the collar 211, the downward force that the striker mass 205 has been exerting on the locking balls 207 will force the locking balls 207 to move outward in the radial direction. Once the locking balls 207 are out of the way of the dimples 209, the downward motion of the striker mass 205 is impeded only by the elastic force of the setback spring 210, which is easily overcome by the impulse provided to the striker mass 205. As a result, the striker mass 205 moves downward, causing the tip 216 of the striker mass 205 to strike the pyrotechnic compound 215 on the surface of the protrusion 217 with the requisite energy to initiate ignition (similar to the configuration shown for the embodiment 30 in FIG. 8).

In the embodiment 200 of the inertial igniter shown in FIGS. 13 and 14, the setback spring 210 is illustrated as a helical wave spring type fabricated with rectangular cross-sectional wires (such as the ones manufactured by Smalley Steel Ring Company of Lake Zurich, Ill.). This is in contrast with the helical springs with circular wire cross-sections used in the embodiments of FIGS. 4-12. The use of the aforementioned rectangular cross-section wave springs or the like has the following significant advantages over helical springs that are constructed with wires with circular cross-sections. Firstly and most importantly, as the spring is compressed and nears its "solid" length, the flat surfaces of the rectangular cross-section wires come in contact and generate minimal lateral forces that would otherwise tend to force one coil to move laterally relative to the other coils as is usually the case when the wires are circular in cross-section. Lateral movement of the coils can, in general, interfere with the proper operation of the inertial igniter since it could, for example jam a coil to the outer housing of the inertial igniter (not shown in FIGS. 13 and 14), which is usually desired to house the igniter 200 or the like with minimal clearance to minimize the total volume of the inertial igniter. In addition, the laterally moving coils could also jam against the posts 203 thereby further interfering with the proper operation of the inertial igniter. The use of the present wave springs with rectangular cross-section eliminates such lateral movement and therefore significantly increases the reliability of the inertial igniter and also significantly increases the repeatability of the initiation for a specified all-fire condition. The second advantage of the use of the aforementioned wave springs with rectangular cross-section, particularly since the wires can and are usually made thin in thickness and relatively wide, the solid length of the resulting wave spring can be made to be significantly less than an equivalent regular helical spring with circular cross-section. As a result, the total height of the resulting inertial igniter can be reduced. Thirdly, since the coil waves are in contact with each other at certain points along their lengths and as the spring is compressed, the length of each wave is slightly increased, therefore during the spring compression the friction forces at these contact points do a certain amount of work and thereby absorb a certain amount of energy. The presence of such friction forces ensures that the firing acceleration and very rapid compression of the spring would to a lesser amount tend to "bounce" the collar 211 back up and thereby increasing the possibility that it would interfere with the exit of the locking balls from the dimples 209 of the striker mass 205 and the release of the striker mass 205. The above characteristic of the wave springs with rectangular cross-section therefore also significantly enhances the performance and reliability of the inertial igniter 200 while at the same time allowing its height (and total volume) to be reduced.

It is appreciated by those skilled in the art that by varying the mass of the striker 205, the mass of the collar 211, the spring rate of the setback spring 210, the distance that the collar 211 has to travel downward to release the locking balls 207 and thereby release the striker mass 205, and the distance between the tip 216 of the striker mass 205 and the pyrotechnic compound 215 (and the tip of the protrusion 217), the designer of the disclosed inertial igniter 200 can match the all-fire and no-fire impulse level requirements for various applications as well as the safety (delay or dwell action) protection against accidental dropping of the inertial igniter and/or the munitions or the like within which it is assembled.

Briefly, the safety system parameters, i.e., the mass of the collar 211, the spring rate of the setback spring 210 and the dwell stroke (the distance that the collar 210 has to travel downward to release the locking balls 207 and thereby release the striker mass 205) must be tuned to provide the required actuation performance characteristics. Similarly, to provide the requisite impact energy, the mass of the striker 205 and the aforementioned separation distance between the tip 216 of the striker mass and the pyrotechnic compound 215 (and the tip of the protrusion 217) must work together to provide the specified impact energy to initiate the pyrotechnic compound when subjected to the remaining portion of the prescribed initiation acceleration profile after the safety system has been actuated.

The striker mass 205 and striker tip 216 may be a monolithic design with the striking tip 216 being formed, as shown in FIG. 13, or as a boss protruding from the striker mass, or the striker tip 216 may be a separate piece, possibly fabricated from a material that is significantly harder than the striker mass material, and pressed or otherwise permanently fixed to the striker mass. A two-piece design would be favorable to the need for a striker whose density is different than steel, but whose tip would remain hard and tough by attaching a steel ball, hemisphere, or other shape to the striker mass. A monolithic design, however, would be generally favorable to manufacturing because of the reduction of part quantity and assembly operations.

The use of three or more posts 203 in the embodiment 200 of FIGS. 13 and 14 has several significant advantages over the two post designs of the embodiments of FIGS. 4-5. namely, unlike the embodiment 30 of FIGS. 4 and 5 in which the striker mass 39 is provided with vertical recesses 40 that are used to engage the posts 33 and serve as guides to allow the striker mass 39 to ride down along the length of the posts 33 without rotation, the use of at least three posts 203 in the embodiment 200 of FIGS. 13 and 14 eliminates the need for the aforementioned vertical recesses in the striker mass 205. As a result, the chances that the striker mass 203 gets jammed at the interface between the aforementioned vertical recesses (40 in FIGS. 4 and 5) and the posts (33 in FIGS. 4 and 5) are almost entirely eliminated. As a result, the reliability of the inertial igniter is significantly increased. Furthermore, the design of the striker mass and the igniter posts and their required manufacturing process are significantly simplified and the required manufacturing precision is also reduced. As a result, the manufacturing cost of the striker mass as well as the igniter body is significantly reduced. Still further, the contacting surfaces between the striker mass 205 and the posts 203 is increased, thereby allowing for a smoother up and down movement of the striker mass 205 along the inner surfaces of the posts 203.

In the embodiment 200 of FIGS. 13 and 14, following ignition of the pyrotechnics compound 215, the generated flames and sparks are designed to exit downward through the opening 204 to initiate the thermal battery below. Alternatively, if the thermal battery is positioned above the inertial igniter 200, the opening 204 can be eliminated and the striker mass could be provided with at least one opening similar to the passage 81 of the striker mass 82 of the embodiment 80 of FIG. 10 to guide the ignition flame and sparks up through the striker mass 205 to allow the pyrotechnic materials (or the like) of a thermal battery (or the like) positioned above the inertial igniter 200 (not shown) to be initiated.

Alternatively, in a manner similar to that shown in the embodiment 90 of FIGS. 11a and 11b, side ports (openings 91) may be provided to allow the flame to exit from the side of the igniter to initiate the pyrotechnic materials (or the like) of a thermal battery or the like that is positioned around the body of the inertial igniter. Alternatively, the igniter housing 261 (FIG. 16) may be eliminated, thereby allowing the generated ignition flames to directly flow to the sides of the igniter 200 and initiate the pyrotechnic materials of the thermal battery or the like.

Figures 15A, 15B:
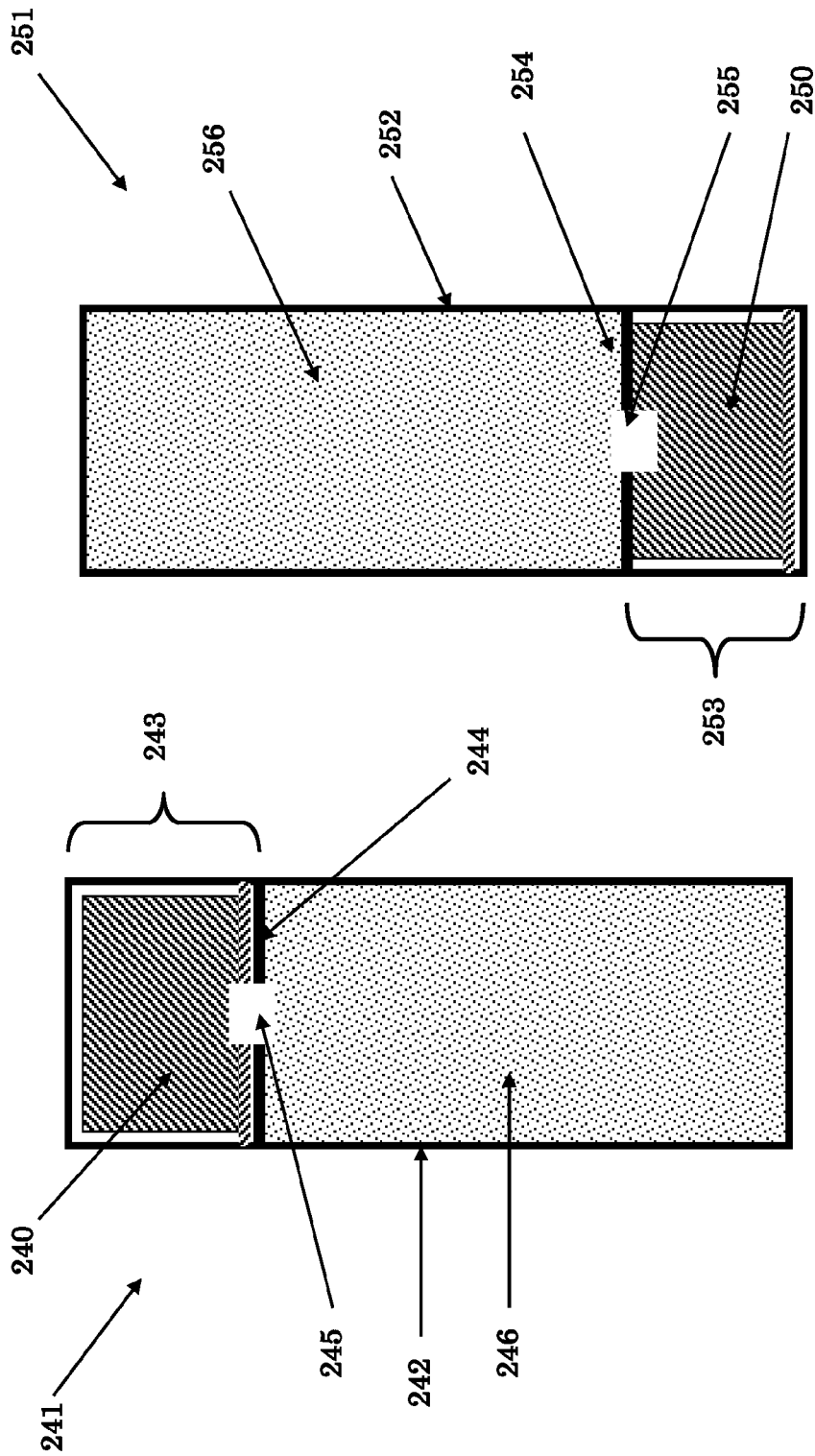
FIGS. 15a and 15b illustrate first and second variations of thermal battery and inertial igniter assemblies.

In FIGS. 13 and 14, the inertial igniter embodiment 200 is shown without any outside housing. In many applications, as shown in the schematics of FIG. 15a (15b), the inertial igniter 240 (250) is placed securely inside the thermal battery 241 (251), either on the top (FIG. 15a) or bottom (FIG. 15b) of the thermal battery housing 242 (252). This is particularly the case for relatively small thermal batteries. In such thermal battery configurations, since the inertial igniter 240 (250) is inside the hermetically sealed thermal battery 241 (251), there is no need for a separate housing to be provided for the inertial igniter itself. In this assembly configuration, the thermal battery housing 242 (252) is provided with a separate compartment 243 (253) for the inertial igniter. The inertial igniter compartment 243 (253) is preferably formed by a member 244 (254) which is fixed to the inner surface of the thermal battery housing 242 (253), preferably by welding, brazing or very strong adhesives or the like. The separating member 244 (254) is provided with an opening 245 (255) to allow the generated flame and sparks following the initiation of the inertial igniter 240 (250) to enter the thermal battery compartment 246 (256) to activate the thermal battery 241 (251). The separating member 244 (254) and its attachment to the internal surface of the thermal battery housing 242 (252) must be strong enough to withstand the forces generated by the firing acceleration.

Figure 1:
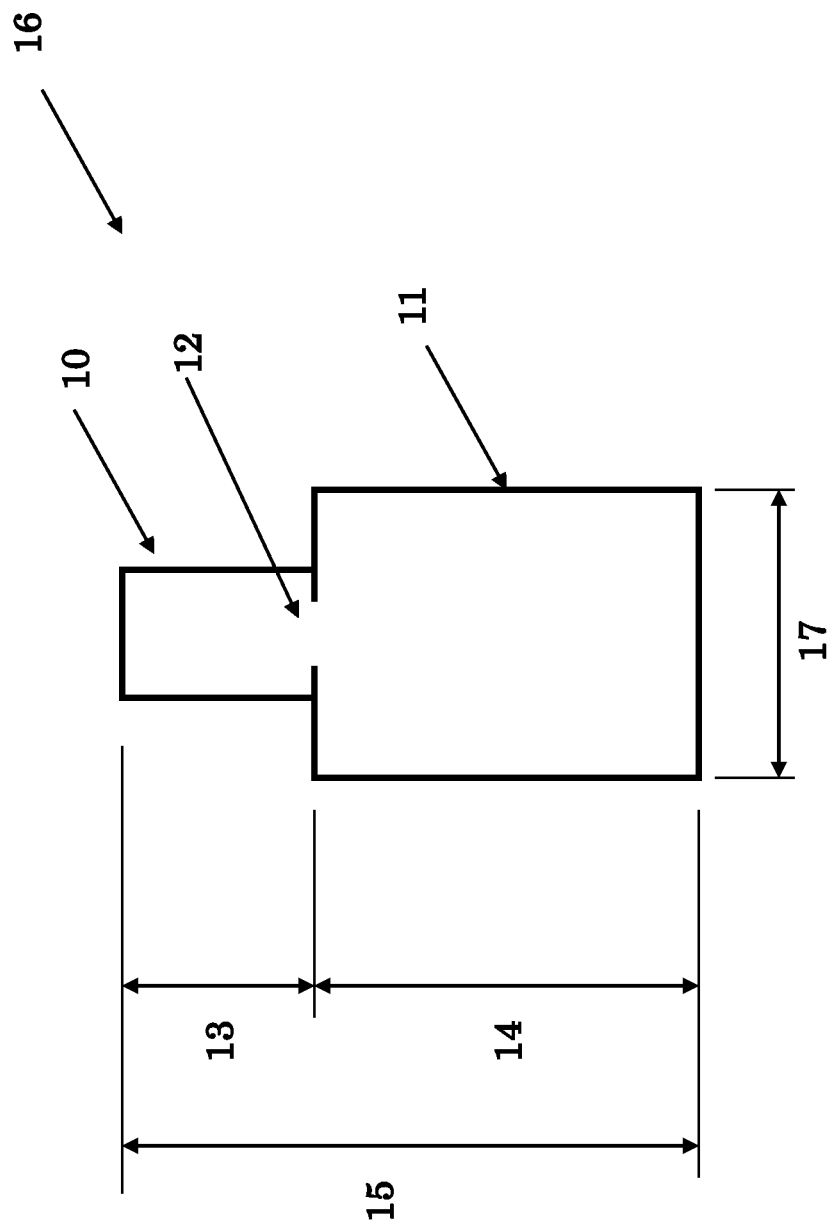
FIG. 1 illustrates a schematic of a cross-section of a thermal battery and inertial igniter assembly.

For larger thermal batteries, a separate compartment (similar to the compartment 10 over or possibly under the thermal battery hosing 11 as shown in FIG. 1 can be provided above, inside or under the thermal battery housing for the inertial igniter. An appropriate opening (similar to the opening 12 in FIG. 1) can also be provided to allow the flame and sparks generated as a result of inertial igniter initiation to enter the thermal battery compartment (similar to the compartment 14 in FIG. 1) and activate the thermal battery.

Figure 16:
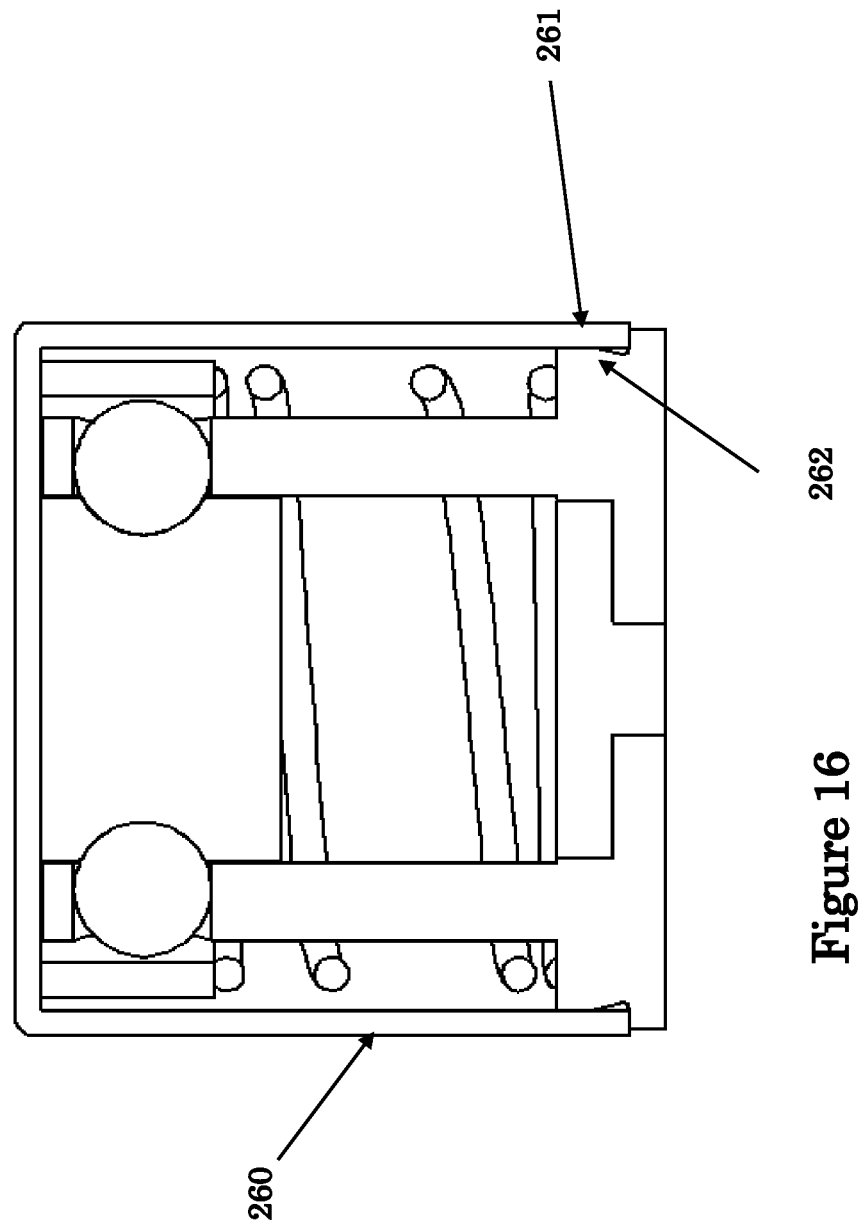
FIG. 16 illustrates a first variation of the inertial igniter of FIG. 13.

The inertial igniter 200, FIGS. 13 and 14 may also be provided with a housing 260 as shown in FIG. 16. The housing 260 is preferably one piece and fixed to the base 202 of the inertial igniter structure 201, preferably by soldering, laser welding or appropriate epoxy adhesive or any other of the commonly used techniques to achieve a sealed compartment. The housing 260 may also be crimped to the base 202 as shown in FIG. 16 for the inertial igniter embodiment 30. The housing 260 may also be crimped to the base 202 at its open end 261, in which case the base 202 is preferably provided with an appropriate recess 262 to receive the crimped portion 261 of the housing 260. The housing can be sealed at or near the crimped region via one of the commonly used techniques such as those described above.

Figure 17:
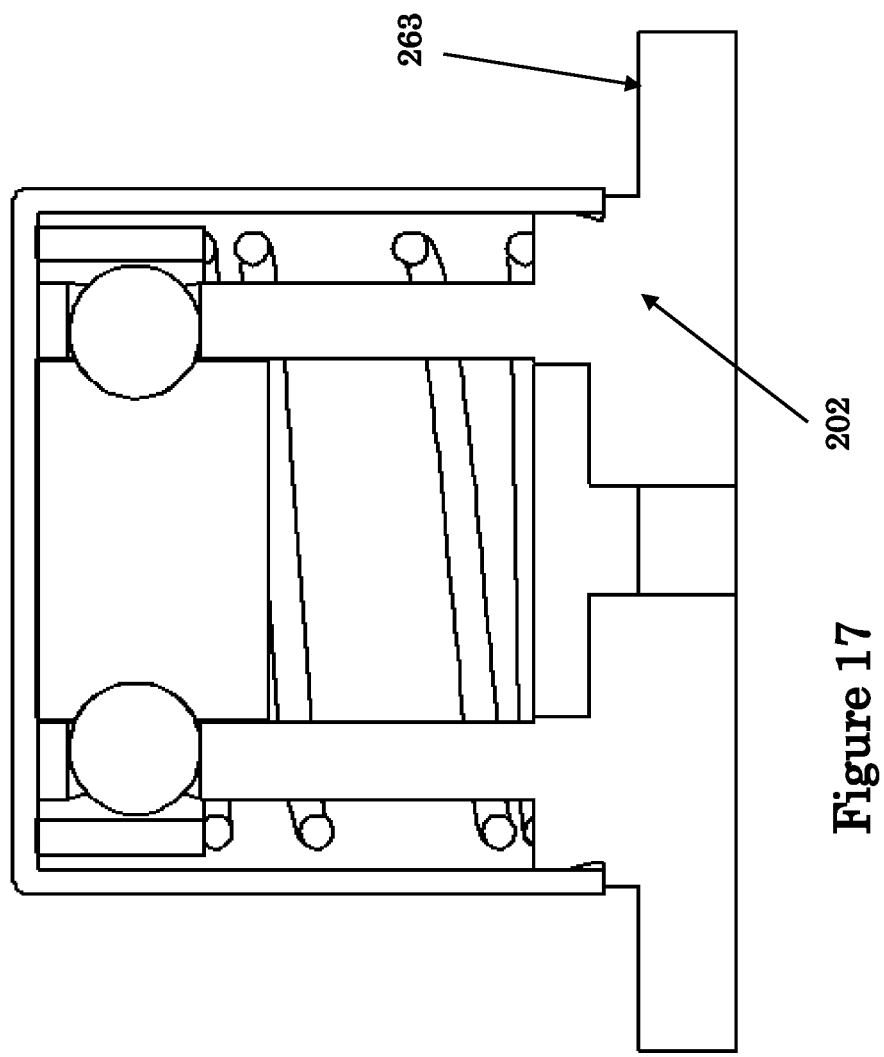
FIG. 17 illustrates a second variation of the inertial igniter of FIG. 13.

In addition, as shown in FIG. 17, the base 202 of the inertial igniter 200 may be extended to form the cap 263, which could be used to form the top cap of the thermal battery as is shown in FIG. 5c and identified with the numeral 36 for the inertial igniter embodiment 30.

Figure 18:
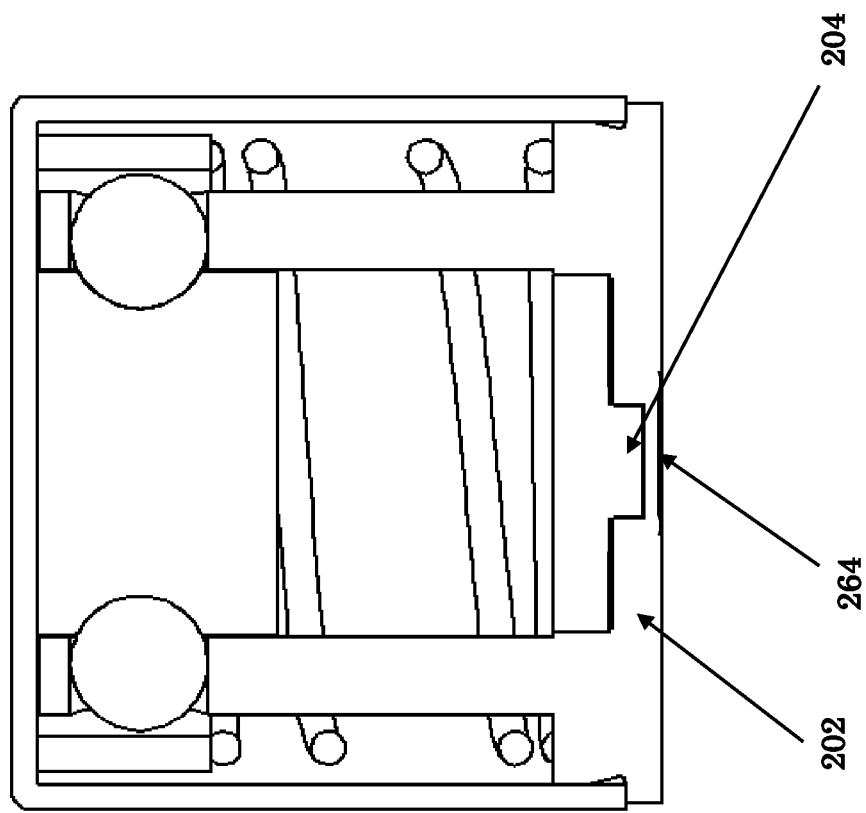
FIG. 18 illustrates a third variation of the inertial igniter of FIG. 13.

The inertial igniter embodiment 200 of FIGS. 13 and 14 as provided with the aforementioned housing 260 and shown in FIG. 16 may also be hermetically sealed. To this end, and as shown in FIG. 18, the opening 204 can be covered, preferably with a thin membrane 264. The membrane 264 can be an integral part of the base 202 and is scorched on its bottom surface (not seen in the view of FIG. 18) to assist it to break open by the pressure generated by the initiation of the pyrotechnics compound 215 (FIG. 13) upon initiation of the inertial igniter to allow the generated flame and sparks to enter the thermal battery through the resulting opening.

In another embodiment, more than one inertial igniter, preferably inertial igniters of the embodiment 200 type are used in a thermal battery to significantly increase the overall reliability of the thermal battery initiation under all-fire condition. As a result, if for any reason one of the inertial igniters fails to initiate or fails to initiate the thermal battery, then there would be one or more (redundant) inertial igniters to significantly reduce the chances that the thermal battery would fail to be activated. The more than one inertial igniters (preferably of embodiment 200 or any other of the aforementioned embodiments) may in general be assembled in any appropriate configuration in the thermal battery. For the case of small thermal batteries, however and if the thermal battery size allows, the inertial igniters are preferably ganged up together in one location, for example on the top or bottom compartments shown in FIGS. 15a and 15b or in the compartment 10 shown in FIG. 1, to minimize the total volume and size occupied by the inertial igniters. For example, when three inertial igniters of the embodiment 200 are to be assembled within a thermal battery, for example of the type shown in FIG. 15a, assuming that the amount of space available in the compartment 243 is appropriate, the three inertial igniters 200 may be ganged up inside the compartment 243 as shown in the top view of FIG. 19 (the top cap is removed to show the inertial igniters 200 inside the compartment 243).

Figure 19:
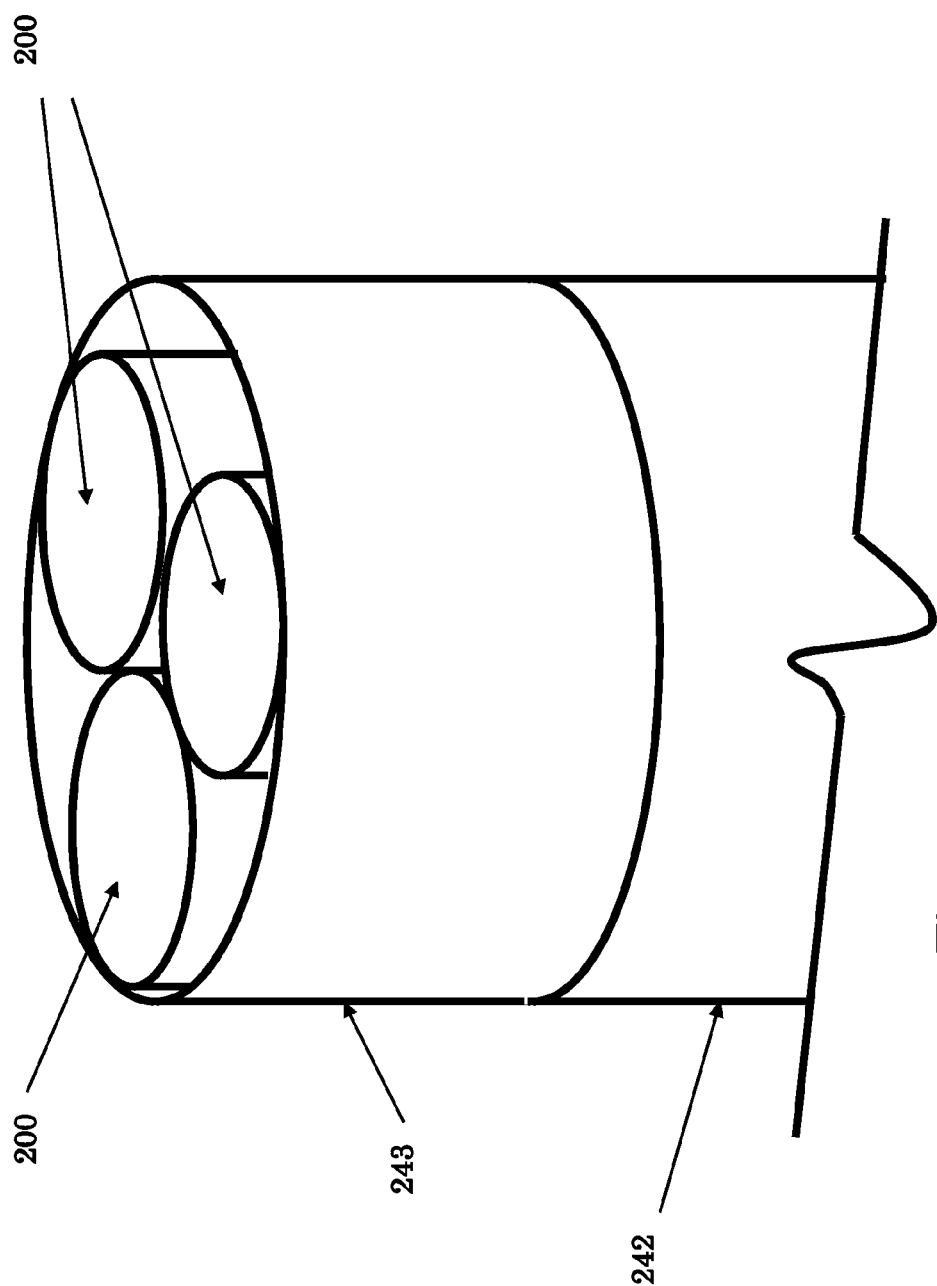
FIG. 19 illustrates a thermal battery/inertial igniter assembly in which more than one inertial igniter is used.

When more than one inertial igniter 200 (or of other embodiment types) are ganged up in a compartment similar to that of 243 as shown in FIG. 19, the body 201 of two or more of the inertial igniters 200 may be integral. For example, the bodies 201 of the three inertial igniters 200 shown in FIG. 19 may be integral as shown in the top and isometric views of FIGS. 20a and 20b, respectively, and identified with reference numeral 265.

In certain applications, it is desired that the inertial igniters ganged up in a compartment such as 243 as shown in FIG. 19 be separated by a wall so that their operations and/or failure (such as flying pieces following initiation or break up of one igniter) would not interfere with the operation of the remaining inertial igniters. In such cases, the inertial igniter bodies (such as the bodies 201 of the inertial igniters 200, FIGS. 13 and 19) and the separation walls 206 between at least two of the inertial igniters may be integral as shown in the isometric and top views of FIGS. 21a and 21b, respectively, and indicated by reference numeral 266. In the drawings of FIGS. 21a and 21b, all three inertial igniters 200 are intended to be separated from each other by the walls 267.

The present inertial igniters are designed such that when ganged up as shown in FIG. 20a or FIG. 21a, their integral bodies 201 can be readily machined, for example from a solid rod, using commonly used CNC machining centers or the like.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An ignition system for a thermal battery, the ignition system comprising:
   a base plate for connection to the thermal battery; and
   two or more inertial igniters formed on the base plate, each of the two or more inertial igniters having a striker mass which ignites one or more pyrotechnic materials upon a predetermined acceleration profile, the base plate having an opening corresponding to each of the two or more inertial igniters for allowing a generated spark to pass into the thermal battery;
   wherein each of the inertial igniters comprises two or more posts connected to the base plate for guiding the striker mass towards the one or more pyrotechnic materials, each of the two or more posts further having a hole for housing a ball, the balls retaining the striker mass from striking the one or more pyrotechnic materials unless the predetermined acceleration profile is experienced by the base plate.

2. The ignition system of claim 1, wherein each of the two or more posts are integrally formed with the base.

* * * * *